(12) United States Patent
Atallah et al.

(10) Patent No.: US 11,487,943 B2
(45) Date of Patent: Nov. 1, 2022

(54) AUTOMATIC SYNONYMS USING WORD EMBEDDING AND WORD SIMILARITY MODELS

(71) Applicant: Tableau Software, LLC, Seattle, WA (US)

(72) Inventors: Ryan Andrew Atallah, Palo Alto, CA (US); Qixiang Zhang, Sunnyvale, CA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 157 days.

(21) Appl. No.: 16/904,462

(22) Filed: Jun. 17, 2020

(65) Prior Publication Data
US 2021/0397792 A1 Dec. 23, 2021

(51) Int. Cl.
*G06F 17/00* (2019.01)
*G06F 40/295* (2020.01)
*G06F 40/169* (2020.01)
*G06F 40/30* (2020.01)

(52) U.S. Cl.
CPC .......... *G06F 40/295* (2020.01); *G06F 40/169* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 10,515,121 B1* | 12/2019 | Setlur | ............... | G06F 16/90332 |
| 10,817,527 B1* | 10/2020 | Setlur | ................... | G06F 16/243 |
| 2017/0286835 A1* | 10/2017 | Ho | ........................... | G06N 3/08 |
| 2018/0300315 A1* | 10/2018 | Leal | ...................... | G06F 16/355 |
| 2019/0188263 A1* | 6/2019 | Ock | ..................... | G06N 3/0427 |
| 2020/0050638 A1* | 2/2020 | Hancock | ........... | G06F 16/90344 |

\* cited by examiner

*Primary Examiner* — Satwant K Singh
(74) *Attorney, Agent, or Firm* — Morgan, Lewis & Bockius LLP

(57) ABSTRACT

A method processes natural language commands (e.g., for data visualization). The method includes obtaining word embeddings (e.g., word vectors) for a set of words (or phrases) of a natural language. In some implementations, the set of words includes high-frequency or common words of the natural language. The method also includes training a word similarity model to identify similar words based on the word embeddings and a synonym database (a large lexical database, such as a thesaurus). The method also includes generating semantic annotations for a published data source using the trained word similarity model, based on the synonym database, and the word embeddings. The method also includes generating a semantic interpretation for a natural language command based on the semantic annotations for the published data source. The method also includes querying the published data source based on the sematic interpretation, thereby retrieving a dataset.

20 Claims, 22 Drawing Sheets

US 11,487,943 B2

AUTOMATIC SYNONYMS USING WORD EMBEDDING AND WORD SIMILARITY MODELS

RELATED APPLICATIONS

This application is related to U.S. patent application Ser. No. 15/804,991, filed Nov. 6, 2017, entitled "Systems and Methods of Using Natural Language Processing for Visual Analysis of a Data Set," which is incorporated by reference herein in its entirety.

This application is also related to U.S. patent application Ser. No. 16/234,470, filed Dec. 27, 2018, entitled "Analyzing Underspecified Natural Language Utterances in a Data Visualization User Interface," which is incorporated by reference herein in its entirety.

This application is also related to U.S. patent application Ser. No. 16/221,413, filed Dec. 14, 2018, entitled "Data Preparation User Interface with Coordinated Pivots," which is incorporated by reference herein in its entirety.

This application is also related to U.S. patent application Ser. No. 16/236,611, filed Dec. 30, 2018, entitled "Generating Data Visualizations According to an Object Model of Selected Data Sources," which is incorporated by reference herein in its entirety.

This application is also related to U.S. patent application Ser. No. 16/236,612, filed Dec. 30, 2018, entitled "Generating Data Visualizations According to an Object Model of Selected Data Sources," which is incorporated by reference herein in its entirety.

This application is also related to U.S. patent application Ser. No. 16/679,234, filed Nov. 10, 2019, entitled "Data Preparation Using Semantic Roles," which is incorporated by reference herein in its entirety.

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, data frequently needs to be manipulated or massaged to put it into a format that can be easily used by database and/or data visualization applications. For example, natural language interfaces have been developed for querying databases and are increasingly being integrated into data visualization applications. For providing better user experience, the data sources have to be curated, prepared, and/or annotated in advance (rather than in an ad-hoc manner). Conventional database and/or data visualization systems do not discover and/or annotate data with synonyms. Some systems are too slow or difficult to maintain, because the database sizes are growing day by day. For example, modern databases include tens or even thousands of data sources, with each data source including tens or thousands of fields, and each field having tens or even millions of values.

SUMMARY

Disclosed implementations provide methods to semantically annotate data fields and data values in a data set, with automatically discovered synonyms, which can be used as part of a database and/or data visualization application.

In accordance with some implementations, a method processes natural language expressions. The method includes obtaining a plurality of word embeddings (e.g., word vectors) for a set of words (or phrases) of a natural language. In some implementations, the set of words includes high-frequency or common words of the natural language. The method also includes training a word similarity model to identify similar words based on the plurality of word embeddings and a synonym database (a large lexical database, such as a thesaurus). The method also includes generating semantic annotations for a published data source using the trained word similarity model, based on the synonym database, and the plurality of word embeddings. The method also includes generating a semantic interpretation for a natural language command based on the semantic annotations for the published data source. The method also includes querying the published data source based on the semantic interpretation, thereby retrieving a dataset.

In some implementations, generating the semantic annotations includes performing a sequence of steps for each data entity name comprising a data field name or a data value of a data field in the published data source. The sequence of steps includes generating respective similar words for the respective data entity name by inputting the respective data entity name into the trained word similarity model, and associating the respective similar words with the data entity name.

In some implementations, generating the respective similar words for the respective data entity name includes: generating one or more matching similar words for the respective data name, using the trained word similarity model; computing a respective similarity score, based on the plurality of word embeddings, for each word of the one or more matching similarity words; and selecting one or more words, from the one or more matching similar words, with respective similarity scores that exceed a predetermined similarity threshold.

In some implementations, generating the respective similar words for the respective data entity name includes: generating, using the synonym database, a list of synonyms for the respective data entity name; and generating matching similar words, using the trained word similarity model, by (i) computing a similarity score for each synonym of the list of synonyms, and (ii) selecting synonyms with similarity scores that exceed a predetermined similarity threshold, based on the plurality of word embeddings. In some implementations, the method further includes removing synonyms that are lexically similar to the respective data entity name from the matching similar words.

In some implementations, the method further includes associating the data entity name with user-provided synonyms and/or inherited synonyms.

In some implementations, training the word similarity model includes generating, using the synonym database, a respective list of synonyms for each word of the set of words of the natural language; and performing a sequence of steps for each word of the set of words. The sequence of steps includes generating a respective list of similar words by inputting the respective word to the trained word similarity model; computing a similarity score (e.g., cosine similarity) for the respective word; and in accordance with a determination that the similarity score for the word is below a similarity threshold, removing the respective word from the set of words. The similarity score represents the extent of similarity between the respective list of similar words and the respective list of synonyms for the respective word, based on the plurality of word embeddings In some implementations, the similarity threshold is obtained by: generating a training dataset that includes an input word and a list of expected synonyms; generating a list of output words by inputting the training dataset into the word similarity model; computing a F1-score for the training dataset; and applying gradient descent to modify an initial similarity threshold (e.g., 0.5) to obtain a value that maximizes the F1-score for the training dataset. The F1-score represents the extent of similarity between the list of output words and the list of expected synonyms.

In some implementations, the method further includes detecting that a new data source has been published. In response to detecting that the new data source has been published, the method generates semantic annotations for the new published data source using the trained word similarity model, based on the synonym database, and the plurality of word embeddings.

In some implementations, the set of words of the natural language is generated using an n-gram language model (e.g., the top 50,000 words and phrases from a Google word n-gram model) for the natural language.

In some implementations, the method further includes generating the plurality of word embeddings using one or more trained neural network models. The one or more trained neural network models are trained on a large corpus of text of the natural language. In some implementations, the one or more neural network models includes a Word2vec model, and the plurality of word embeddings are word vectors output by the Word2vec model.

In some implementations, generating the semantic interpretation includes extracting one or more independent analytic phrases from the natural language command, and computing semantic relatedness of the extracted analytic phrases and one or more data entity names of the published data source, based on the semantic annotations, and computing analytical functions associated with the extracted analytic phrases, thereby creating functional phrases. Querying the published data source based on the semantic interpretation includes: (i) generating one or more queries based on the created functional phrases and (ii) querying the database using the one or more queries.

In some implementations, the method further includes selecting the word similarity model from a plurality of word models.

In some implementations, the method further includes storing the semantic annotations to the published data source.

In some implementations, the method further includes receiving user input to specify the natural language command. In response to receiving the user input, the method generates the semantic interpretation.

In some implementations, the method further includes displaying a data visualization based on the retrieved dataset.

In some implementations, generating the semantic annotations for the published data source using the trained word similarity model is performed concurrently for a plurality of data entity names of the published data source, using a distributed, multitenant-capable text search engine (e.g., Elasticsearch).

In some implementations, a computer system has one or more processors, memory, and a display. The memory stores one or more programs having instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
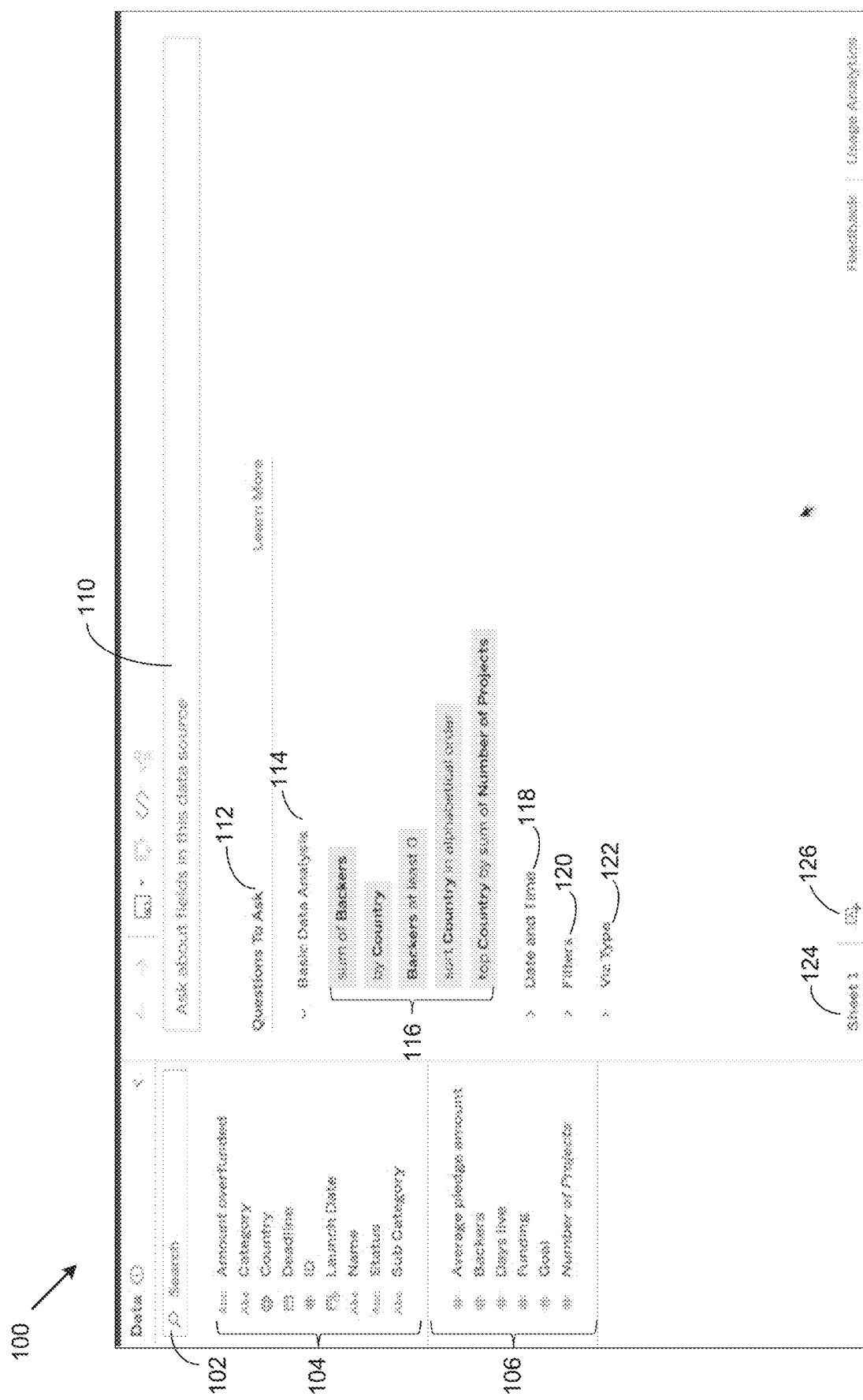
FIG. 1 illustrates a graphical user interface used in some implementations.

FIG. 1 illustrates a graphical user interface 100 in accordance with some implementations. The user interface 100 can be used to search for data fields and/or data values of the data fields in published data sources. Both "data fields" and "data values" for those data fields will be referred to as "data entities." In some implementations, the user interface 100 provides a search field 102 that enables a user to search for data entities. Some implementations provide various options or affordances (e.g., options 104 and 106) to search different types and/or different levels of information about data in data sources, or to switch between data sources. Some implementations provide a search bar 110 to ask about fields in a data source. Some implementations provide example questions to ask 112. Some implementations provide basic data analysis 114 related questions 116, date and time information related questions 118, filters 120, and/or visualization type 122. Some implementations provide these capabilities for one or more sheets (e.g., a first sheet 124). Some implementations provide an option 126 to add additional sheets. In this way, some interfaces provide users with options or suggestions to ask natural language questions to query data sources. The suggestions for questions are automatically generated according to some implementations.

Figure 2:
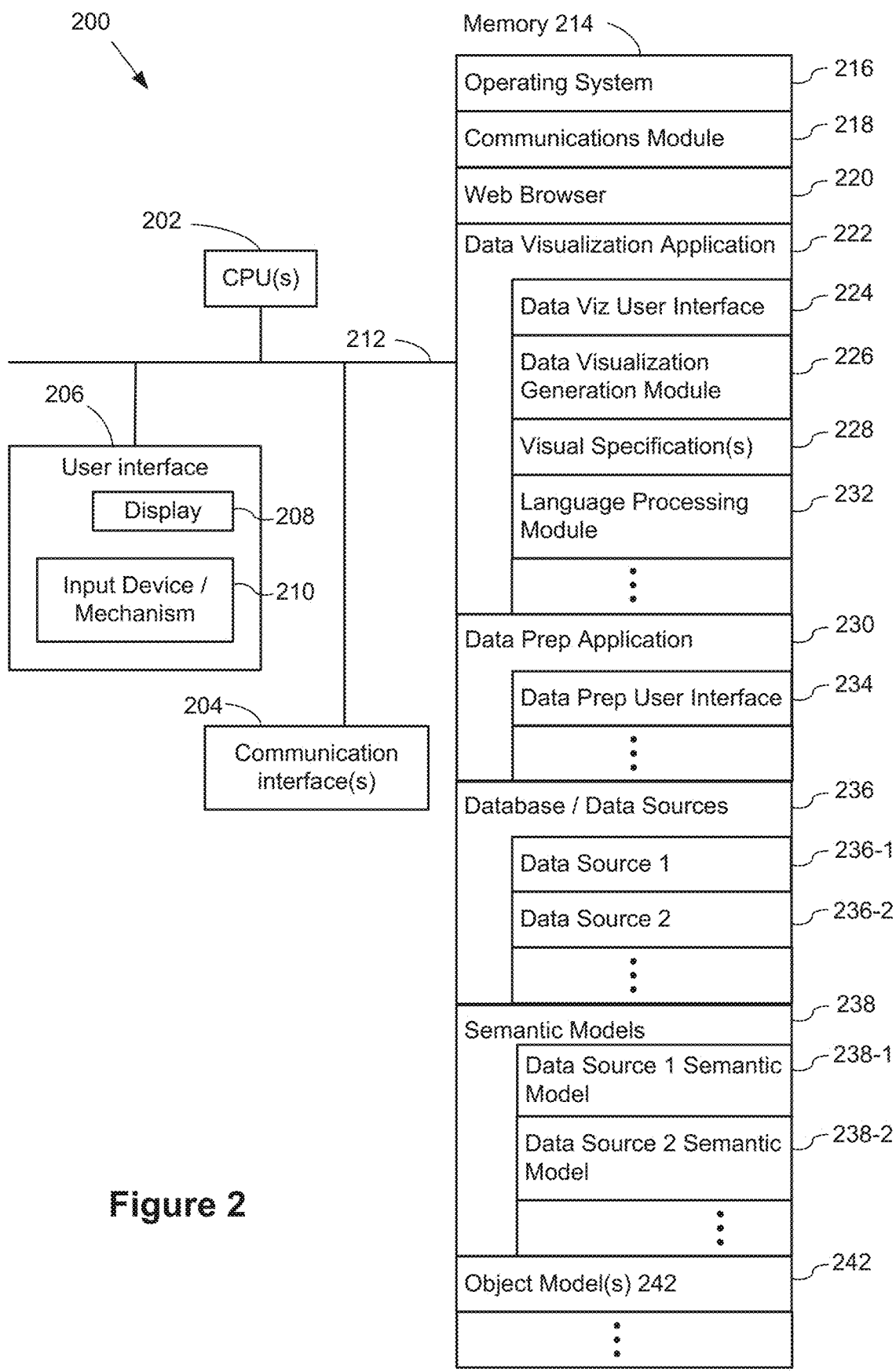
FIG. 2 is a block diagram of a computing device in accordance with some implementations.

FIG. 2 is a block diagram illustrating a computing device 200 that can display the graphical user interface 100 in accordance with some implementations. The computing device can also be used by a data preparation ("data prep") application 230. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

an operating system 216, which includes procedures for handling various basic system services and for performing hardware dependent tasks;

a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;

a web browser 220 (or other application capable of displaying web pages), which enables a user to communicate over a network with remote computers or devices;

a data visualization application 222, which provides a data visualization user interface 224 (e.g., the graphical user interface 100) for a user to construct visual graphics and/or ask natural language queries. For example, a user selects one or more data sources 236 (which may be stored on the computing device 200 or stored remotely), selects data fields from the data sources and/or searches for data fields from the data sources that match a natural language query, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server. In some implementations, the data visualization application 230 includes a language processing module 232 for processing (e.g., interpreting) commands provided by a user of the computing device. In some implementations, the commands are natural language commands (e.g., captured by an audio input device). In some implementations, the language processing module 232 includes sub-modules such as an autocomplete module, a pragmatics module, and/or an ambiguity module. In some implementations, the memory 214 stores metrics and/or scores determined by the language processing module 232. In addition, the memory 214 may store thresholds and other criteria, which are compared against the metrics and/or scores determined by the language processing module 232. For example, the language processing module 232 may determine a relatedness metric (discussed in detail below) for an analytic word/phrase of a received command. Then, the language processing module 232 may compare the relatedness metric against a threshold stored in the memory 214;

zero or more databases or data sources 236 (e.g., a first data source 236-1 and a second data source 236-2), which are used by the data visualization application 222. In some implementations, the data sources are stored as spreadsheet files, CSV files, XML, files, or flat files, or stored in a relational database;

zero or more semantic models 238 (e.g., a first semantic model 238-1 and a second semantic model 238-2), each of which is derived directly from a respective database or data source 236. A semantic model 238 represents the database schema and contains metadata about attributes. In some implementations, a semantic model 238 also includes metadata of alternative labels or synonyms of the attributes. A semantic model 238 includes data types (e.g., "text," "date," "geospatial," "Boolean," and "numeric"), attributes, (e.g., a currency type such as the United States Dollar), and a semantic role or a data role (e.g., "City" role for a geospatial attribute) for data fields of the respective database or data source 236. In some implementations, a semantic model 238 also captures statistical values (e.g., data distribution, range limits, average, and cardinality) for each attribute. In some implementations, a semantic model 238 is augmented with a grammar lexicon that contains a set of analytical concepts found in many query languages (e.g., average, filter, and sort). In some implementations, a semantic model 238 also distinguishes between attributes that are measures (e.g., attributes that can be measured, aggregated, or used for mathematical operations) and dimensions (e.g., fields that cannot be aggregated except by counting). In some implementations, the semantic models 238 include one or more concept graphs that encapsulate semantic information for the data sources 236. In some implementations, the one or more concept graphs are organized as directed acyclic graphs, and/or embody hierarchical inheritance of semantics between one or more entities (e.g., logical fields, logical tables, and data fields). Thus, the semantic models 238 help with inferencing and assigning semantic roles to fields; and zero or more object models 242, which identify the structure of the data sources 236. In an object model (or a data model), the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes.

In some instances, the computing device 200 stores a data prep application 230, which can be used to analyze and massage data for subsequent analysis (e.g., by a data visualization application 222). The data prep application 230 provides a user interface 234, which enables users to build process flows, according to some implementations.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
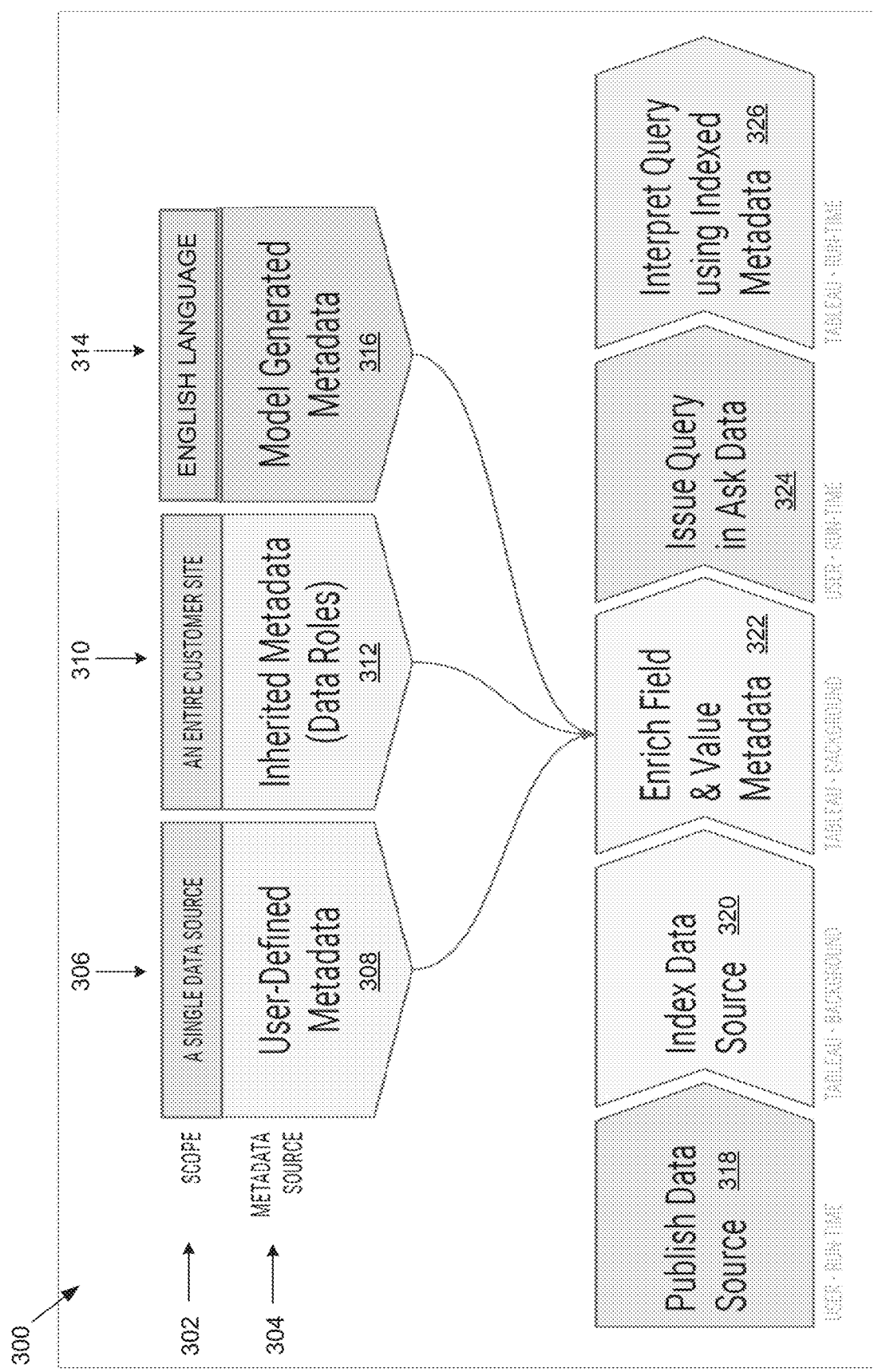
FIG. 3 is a flow diagram of a process for enriching data sources in accordance with some implementations.

FIG. 3 is a flow diagram of a process 300 for enriching data sources in accordance with some implementations. The process 300 begins with a user (or a runtime) publishing (318) a data source (e.g., the data sources 236-1). According to some implementations, the process 300 includes indexing (320) the data source to identify data entities (i.e., data fields from the data source or the data values of those data fields). The data entities are enriched (322) with metadata. In some implementations, the indexing (320) and enriching (322) are performed in a background process on a server (e.g., the computer system 200). In some implementations, the indexing (320) and/or enriching (322) steps are performed concurrently for multiple data sources, and/or multiple datasets. FIG. 3 also shows different types of sources 304 for the metadata and individual scopes 302, according to some implementations. Some implementations include user-defined metadata 308 (e.g., metadata provided by a user via a user interface) from a single data source 306. Some implementations include inherited metadata (sometimes called data roles) 312 that span across an entire customer site 310. Some implementations include model generated metadata 316 derived from a natural language 314 (e.g., English). When a user issues (324) a natural language query/question (e.g., via a natural language user interface) and/or when the runtime processes a natural language query, the run-time interprets (326) the query using indexed metadata, according to some implementations.

Figure 4A:
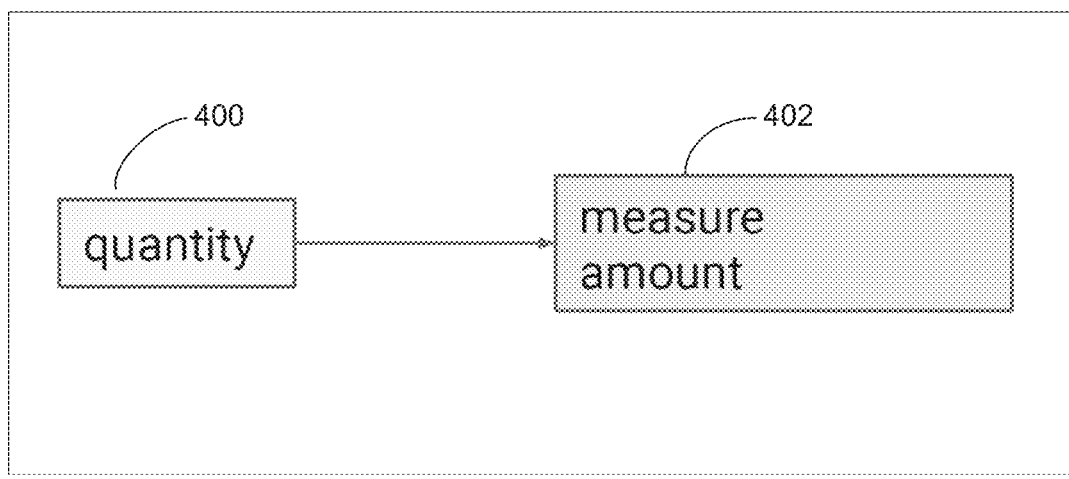
FIGS. 4A and 4B provide examples of synonyms in accordance with some implementations.
Figure 4B:
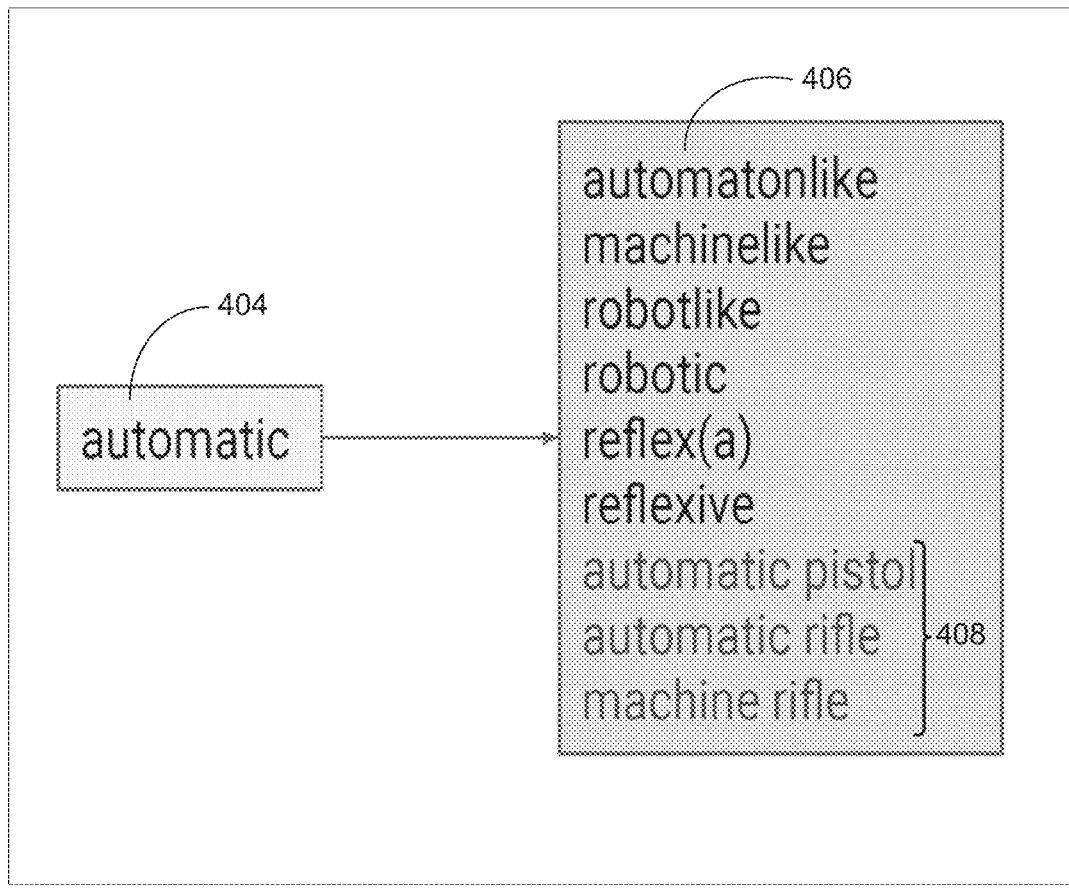

FIGS. 4A and 4B provide examples of synonyms in accordance with some implementations. Some implementations use a synonym database or a thesaurus (e.g., WordNet) to generate synonyms for words or phrases. For example, a synonym database outputs synonyms 402 and 406 for the input words 400 and 404, respectively. A natural language lexical database, such as a thesaurus, can be useful to generate an initial possible set of synonyms. Some lexical databases, such as WordNet, group words based on their meanings and/or word senses, semantically disambiguating the words, and sometimes labelling the semantic relations among words. Yet, relying entirely on a lexical database produces mixed results. For example, a synonym database returns similar words for the word 'quantity' that includes the words 'measure' and 'amount'. On the other hand, the results 406 for the word 'automatic' include the less relevant terms 408 ('automatic pistol', 'automatic rifle' and 'machine rifle'), which would not be useful in many contexts.

Figure 5:
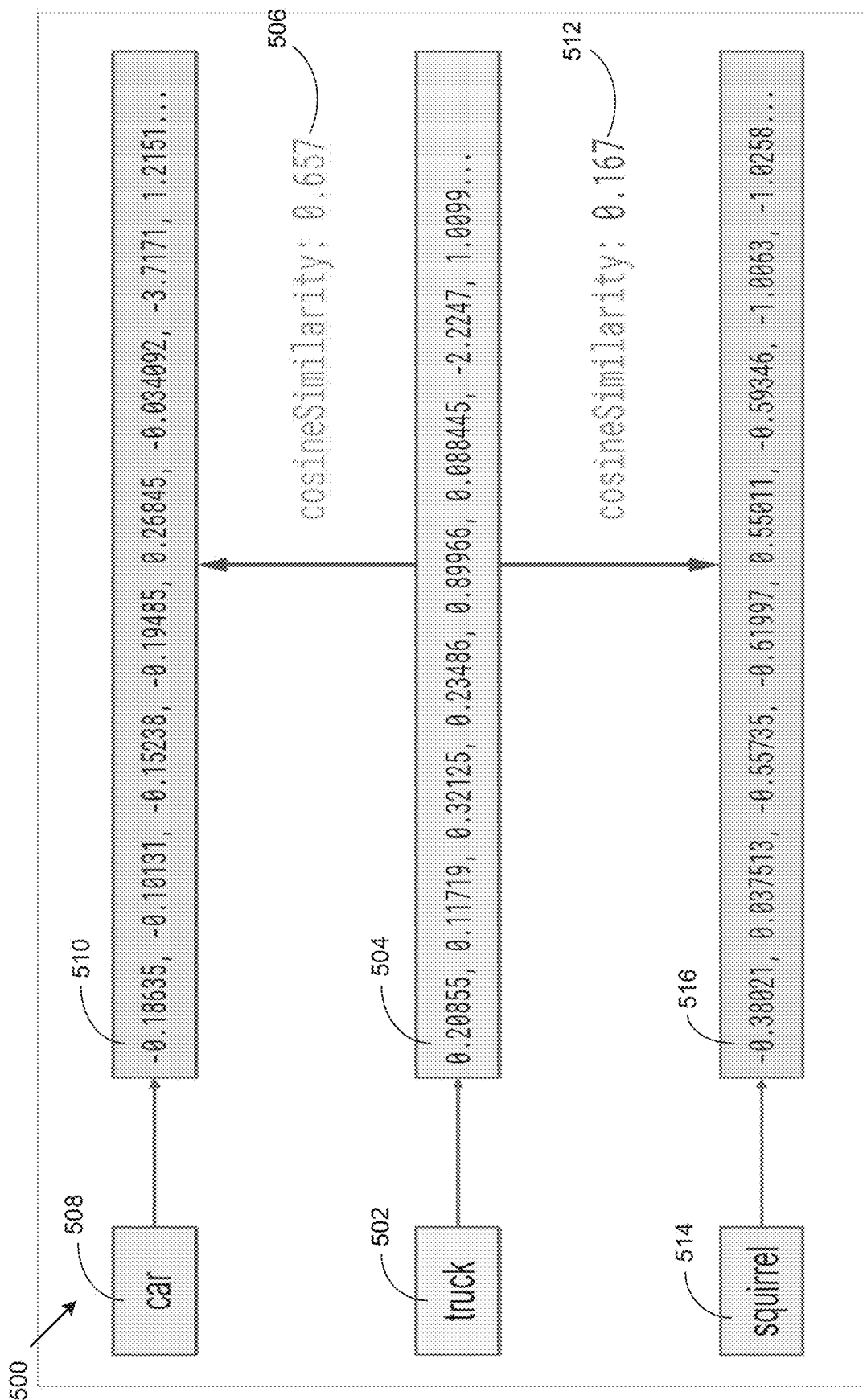
FIG. 5 illustrates computing word similarity based on word embeddings in accordance with some implementations.

FIG. 5 illustrates example word embeddings in accordance with some implementations. Word embeddings map words or phrases from a vocabulary to vectors of real numbers, and are useful for natural language modeling and feature learning. Word2vec and GloVe are example models. Some implementations use different (or multiple) word embedding models depending on the dataset. As illustrated in FIG. 5, the "distance" between words in the vector space is indicative of the level of similarity between the corresponding words. For example, the word 'truck' 502 is mapped to the embedding 504, the word 'car' 508 is mapped to the embedding 510, and the word 'squirrel' is mapped to the embedding 516. Some implementations calculate cosine similarity (or other word similarity scores or metrics) between two embeddings to determine the similarity between corresponding words. In FIG. 5, is word 'truck' is more similar to the word 'car' (with cosine similarity of 0.657 (506)) than it is to the word 'squirrel' (with cosine similarity of 0.167 (512)).

Figure 6A:
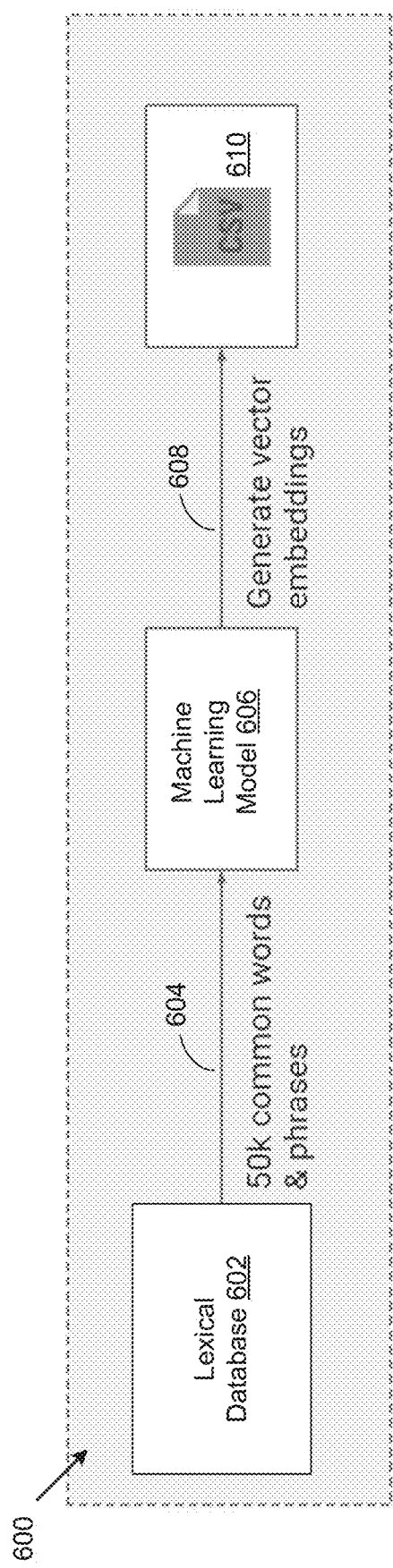
FIGS. 6A and 6B show block diagrams of processes for annotating data sources with synonyms and using the annotations to answer natural language commands/questions in accordance with some implementations.
Figure 6B:
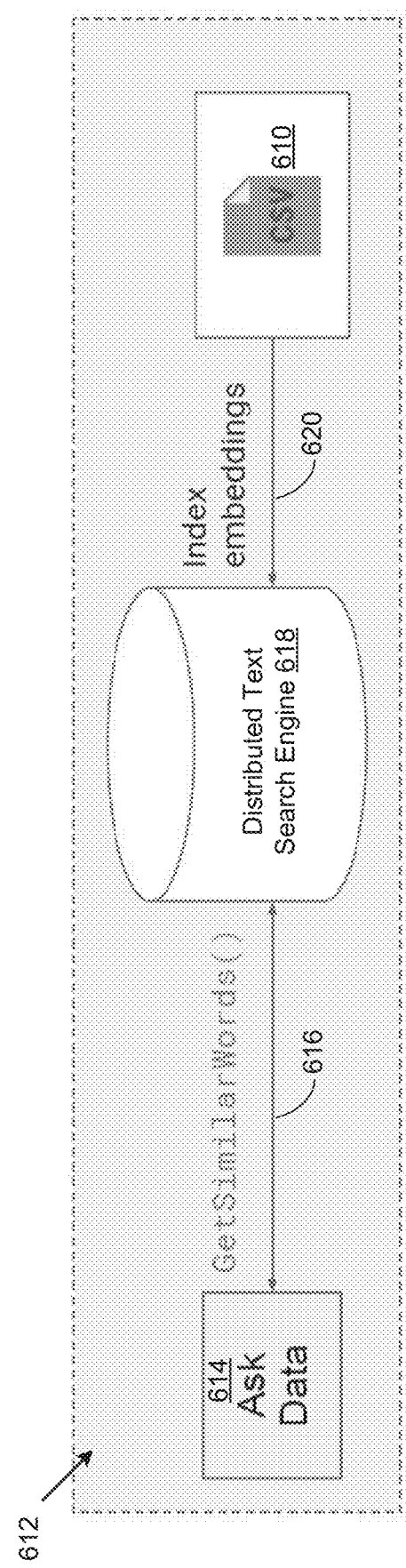

FIGS. 6A and 6B show block diagrams of processes for annotating data sources with synonyms and using the annotations to answer natural language questions in accordance with some implementations. FIG. 6A corresponds to an offline task 600 where common words or phrases (e.g., the top 50,000 words) are selected (604) from a lexical database 602 and a machine learning model 606 (e.g., TensorFlow) is trained to generate (608) vector embeddings (or word embeddings) 610. Some implementations store the vector embeddings in a comma-separated values file (a CSV file) or using a similar file format. In some implementations, when a data source is published, a runtime or a distributed text search engine 618 (e.g., ElasticSearch) indexes (620) the vector embeddings 610 to annotate the data source with synonyms. Subsequently, when a user asks a natural language question 614, the runtime uses (616) a trained word similarity model (e.g., using a GetSimilarWords( ) function) to determine, based on the annotations, data entities (data fields or data values of data fields) with names similar to words or phrases in the natural language question. Some implementations generate queries based on the names to retrieve datasets from the data source.

Figure 7A:
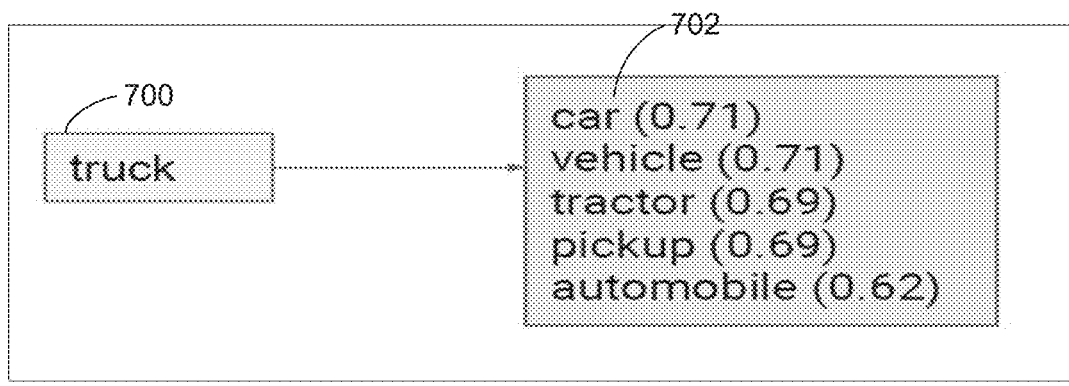
FIGS. 7A and 7B are examples of similar words obtained using a word similarity model in accordance with some implementations.
Figure 7B:
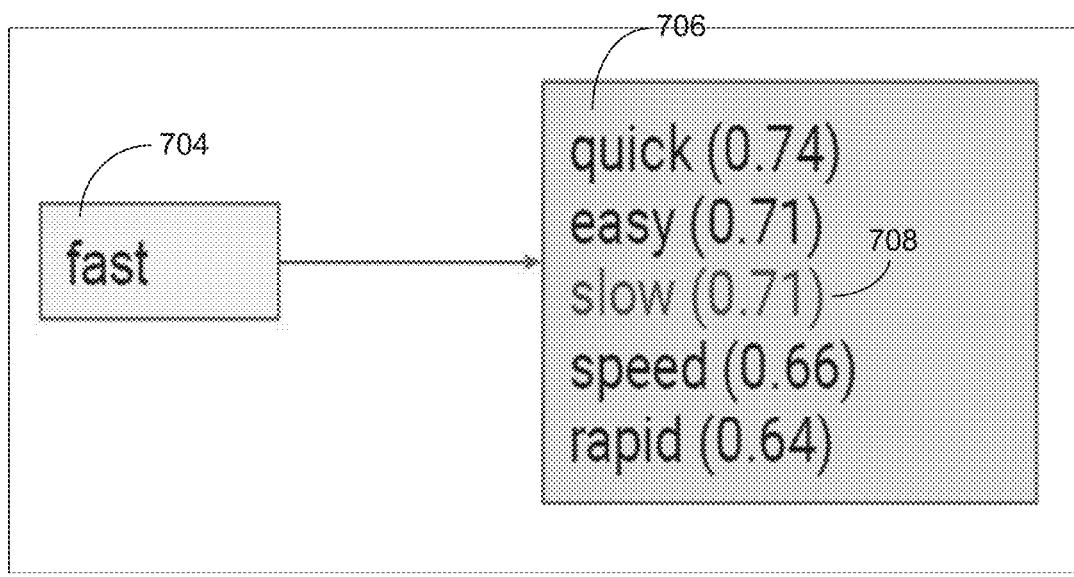

FIGS. 7A and 7B are examples of similar words obtained using a trained word similarity model described above in reference to FIGS. 6A and 6B, in accordance with some implementations. FIG. 7A shows the word 'truck' 700 mapped to the words 702 (car', 'vehicle', 'tractor', 'pickup', and 'automobile'). The similarity scores are indicated in parentheses (0.71, 0.71, 0.69, 0.69, and 0.62) next to the corresponding similar words; higher similarity scores indicate more similarity between the input and output words. FIG. 7B shows the word 'fast' 704 mapped to the words 706 ('quick' with a similarity score of 0.74, 'easy' with a similarity score of 0.71, 'slow' with a similarity score of 0.71, 'speed' with a similarity score of 0.66, and the word 'rapid' with a similarity score of 0.64). The trained word similarity model described above in reference to FIGS. 6A and 6B can sometimes generate incorrect synonyms (a problem addressed with the synonym constraints as described below in reference to FIG. 9A). For example, the word 'slow' 708 with a similarity score of 0.71 is considered a synonym of the word 'fast'.

Figure 8:
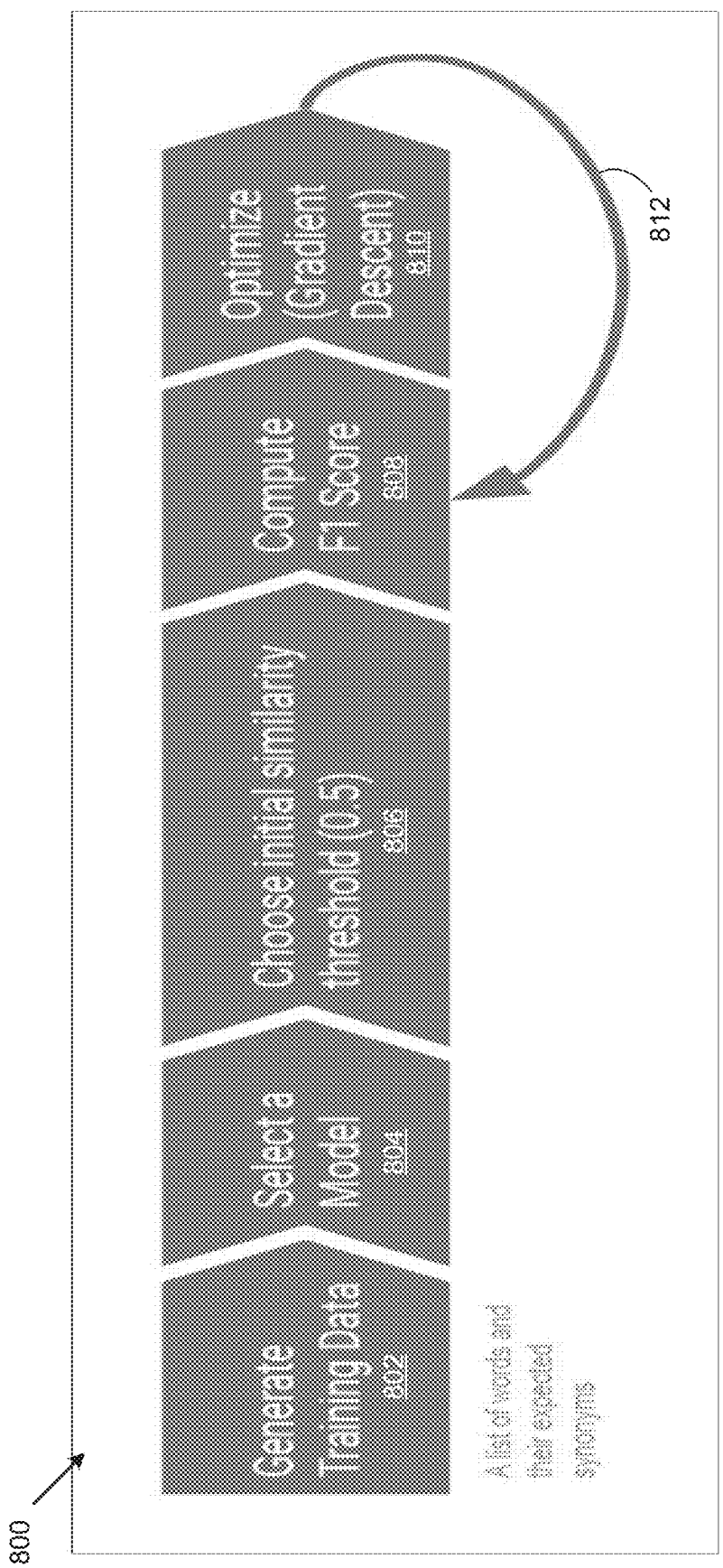
FIG. 8 is an example process for determining a similarity threshold according to some implementations.

FIG. 8 is an example process 800 for determining a similarity threshold (or training the word similarity model) according to some implementations. The process 800 includes generating (802) training data that includes a list of words and their expected synonyms, selecting (804) a model, selecting (806) an initial similarity threshold (e.g., 0.5), computing (808) an F1 score, and iterating (812) to optimize (810) the similarity threshold (e.g., using gradient descent). The training process 800 is performed at runtime, and determines a similarity threshold to use on top of a trained word embedding model. The trained word similarity model is used at runtime when generating similar words using vector embeddings from the word embedding model. In some implementations, the word embedding model is indexed using ElasticSearch.

Figure 9A:
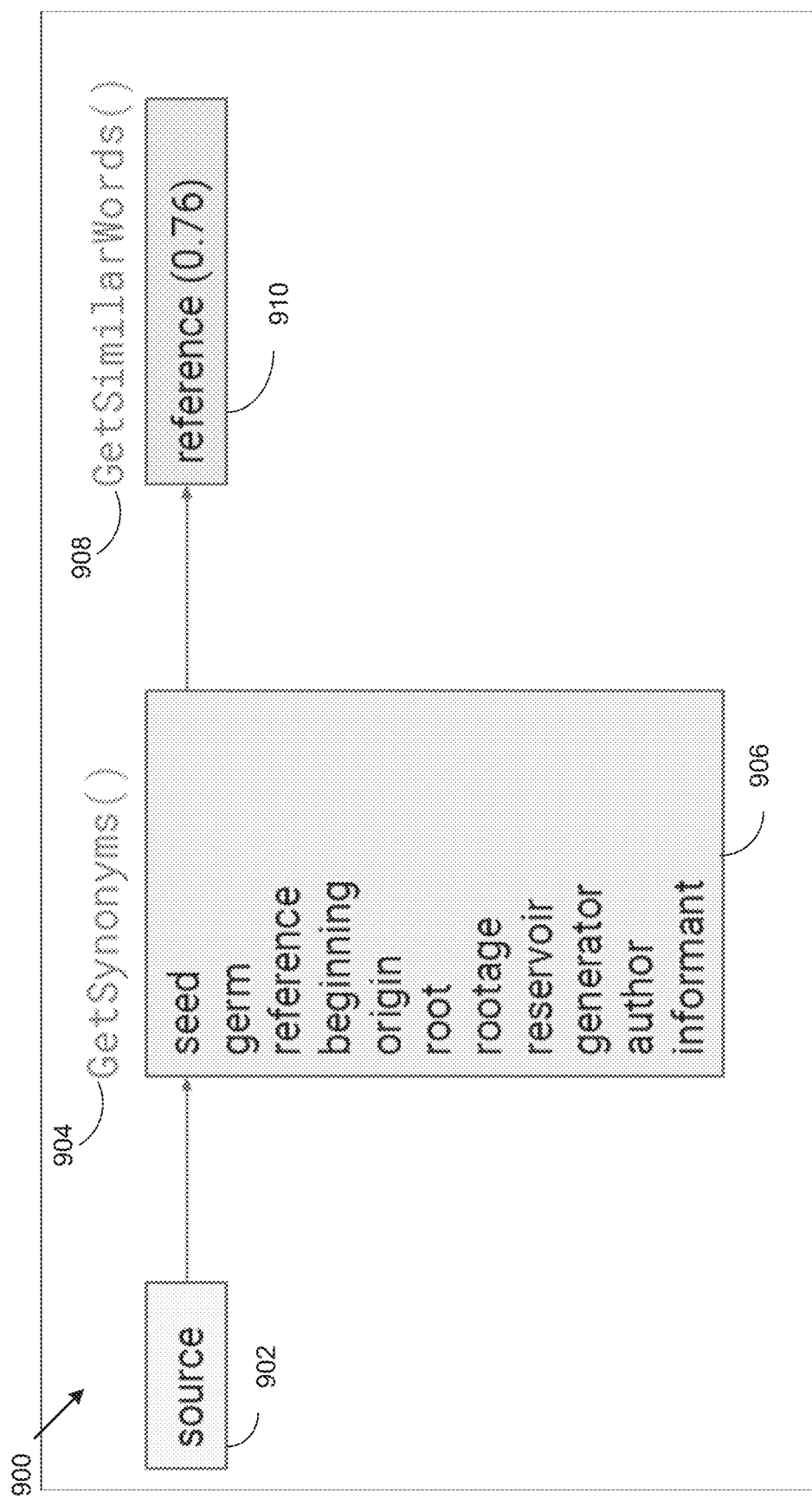
FIG. 9A is an example of a combined model using synonyms and a similarity model according to some implementations.

FIG. 9A is an example of a combined model 900 using synonyms and the trained word similarity model according to some implementations. At a high level, each word 902 (e.g., the word 'source') or phrase is mapped (904) (e.g., using a GetSynonyms( ) function call) to one or more synonyms 906. Subsequently, the trained word similarity model is queried with the constraint to restrict its search for similar words from amongst the synonyms 906. The trained word similarity model determines (908) similar words 910 to the word 902 from the synonyms 904 that exceed a predetermined similarity threshold (determined during the training process described above in reference to FIG. 8). In the example shown, the process 900 returns the word 'reference' 910 with a similarity score of 0.76 from among the synonyms 906 (including the words 'seed', 'germ', 'reference', 'beginning', 'origin', 'root', 'rootage', 'reservoir', 'generator', 'author', and 'informant'), according to some implementations. The other words do not have high enough similarity scores to be included.

Figure 9B:
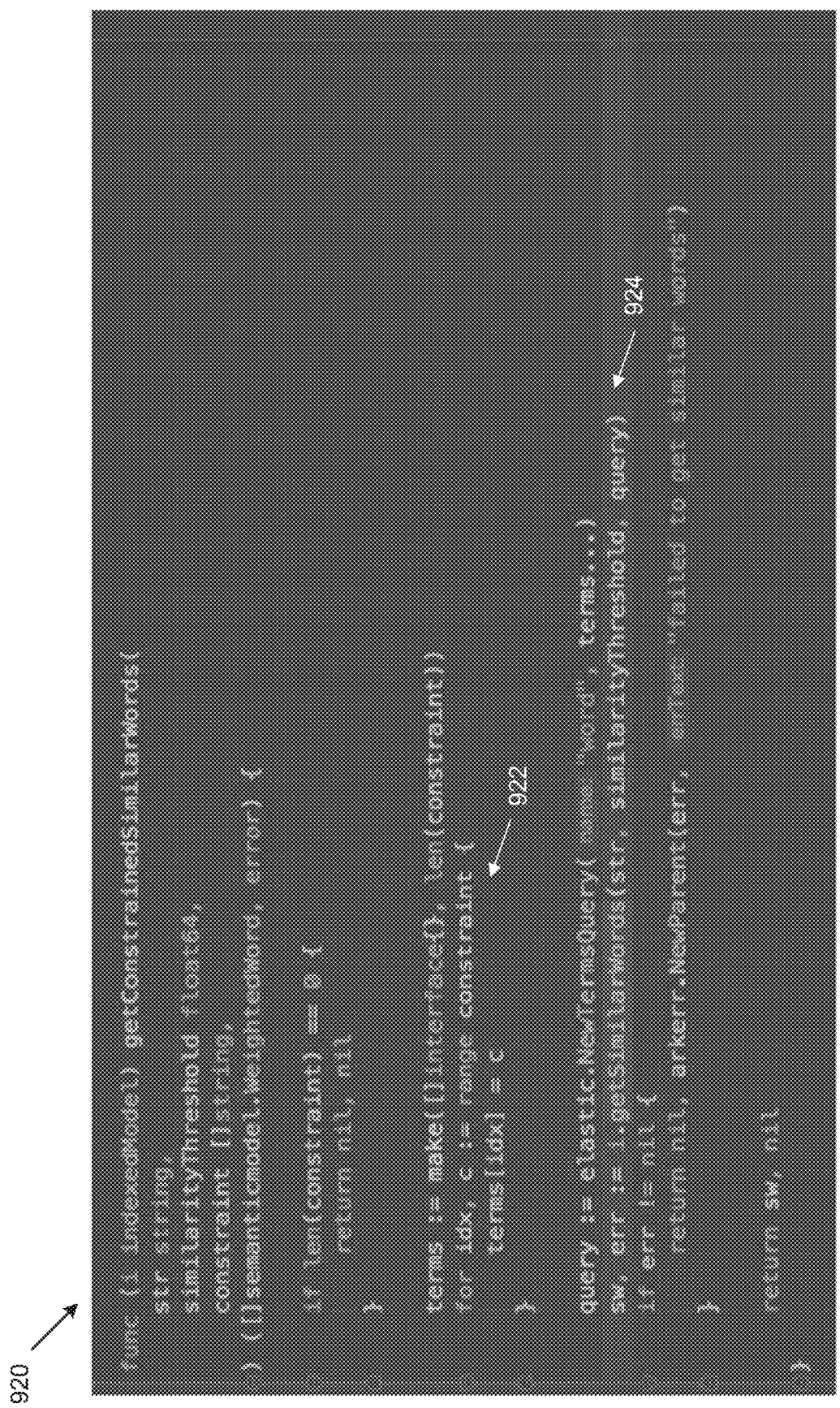
FIGS. 9B and 9C are example code snippets implementing the combined model of FIG. 9A, in accordance with some implementations.
Figure 9C:
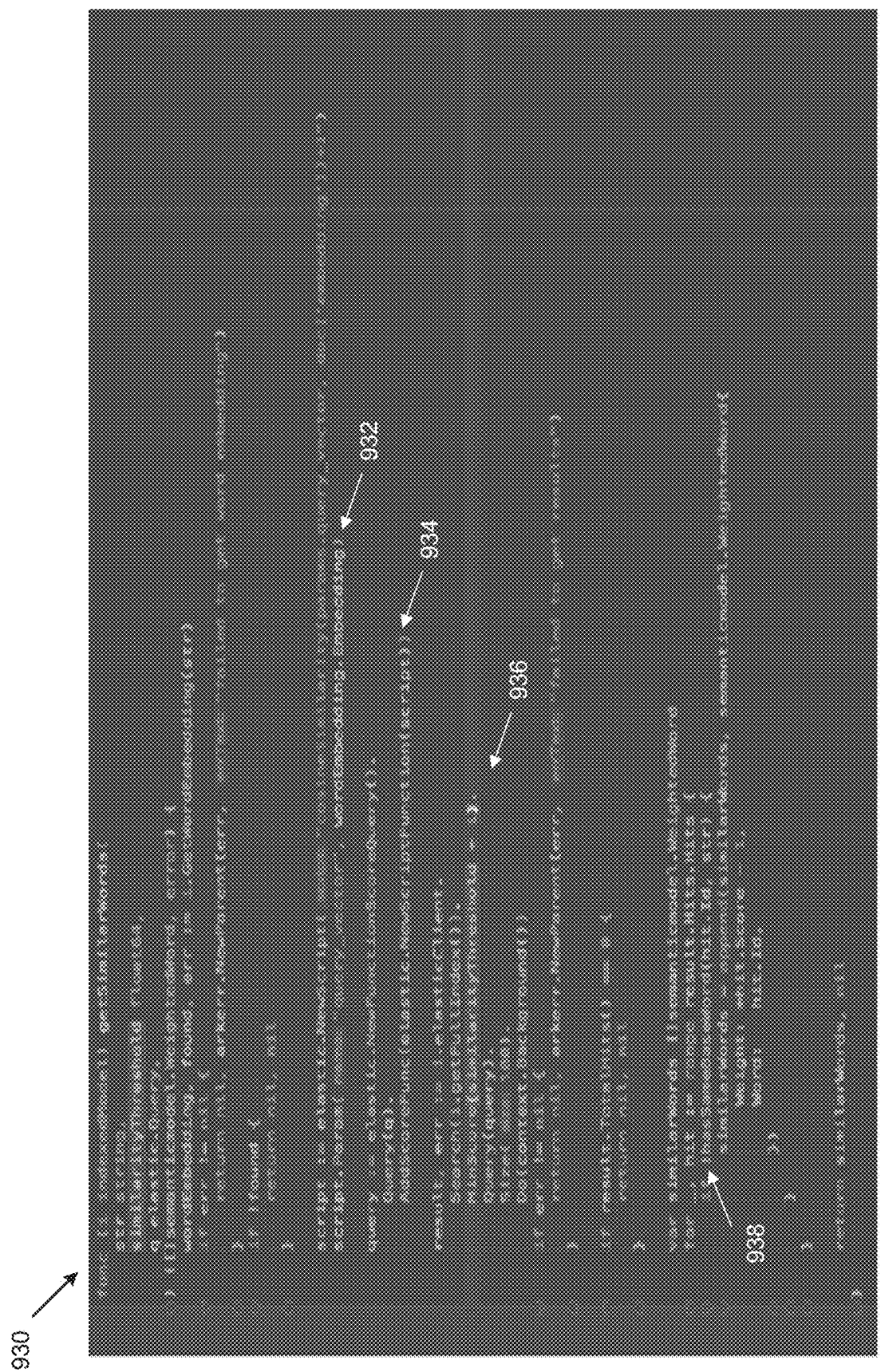

FIGS. 9B and 9C are example code snippets implementing the combined model of FIG. 9A, in accordance with some implementations. FIG. 9B shows an example getConstrainedSimilarWords function 920 that accepts an input word (or phrase), a similarity threshold, and a list of constraints (e.g., synonyms from a thesaurus obtained via a getSynonyms( ) function). The function retrieves matching similar words (using Elasticsearch) that exceed the similarity threshold. The function generates the Elasticsearch subquery (922) that filters or constraints (924) indexed word embeddings to a list of synonyms (e.g., synonyms obtained from a lexical database, such as a thesaurus, using a getSynonym( ) function call). FIG. 9C shows an example getSimilarWords function 930, which accepts an input word (or phrase), a similarity threshold, and an Elasticsearch subquery. The functions looks up (934) the input word's embedding from Elasticsearch, uses (932) a cosine similarity function (cosine Similarity) to compute (936) word similarity based on the input similarity threshold. In some implementations, the function removes (938) words with similar base words as the input word (or phrase) when generating an output list of similar words.

Figure 10:
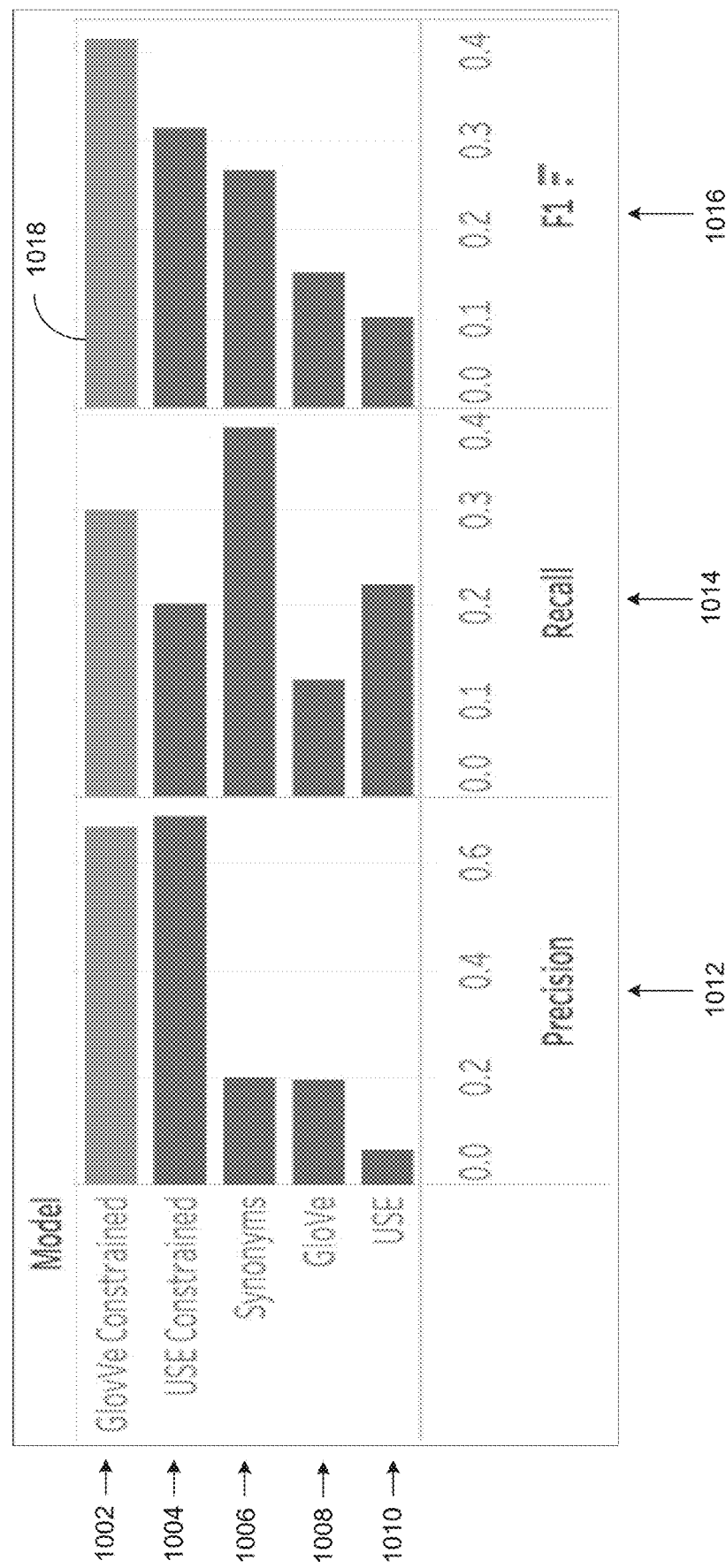
FIG. 10 is a bar chart comparing performance of different models for determining synonyms of data entities, in accordance with some implementations.

FIG. 10 is a bar chart 1000 comparing the performance of different models for determining synonyms of data entities, in accordance with some implementations. FIG. 10 compares five models (a USE model 1010, a GloVe model 1008, a Synonyms model 1006, a USE constrained model 1004, and a GloVe constrained model 1002) for precision 1012, recall 1014, and a combined F1 score 1016. The precision scores 1012 correspond to the ratio of correctly predicted positive observations to the total predicted positive observations (high precision relates to low false positives). The recall scores 1014 correspond to the ratio of correctly predicted positive observation to all possible observations. Each F1 score 1016 is the weighted average of precision and recall, and takes into account both false positives and false negatives. The F1 score is useful when there is an uneven class distribution. The USE model 1010 refers the Universal Sentence Encoder model, the GloVe model 1008 corresponds to a word embedding model, the Synonyms model 1006 corresponds to a synonym database, the USE constrained model 1004 corresponds to a combined USE and Synonyms model, and the GloVe constrained model 1002 corresponds to a combined word embedding and word similarity model (described above in reference to FIGS. 9A-9C), according to some implementations. As illustrated, the GloVe constrained model 1002, which is the combined word embedding and word similarity model, with constraints from the synonym database, shows a F1 score 1018 that exceeds the other models. In this way, the combined word embedding and word similarity model (constrained by the synonyms) produces better similar words than the other models.

Figure 11A:
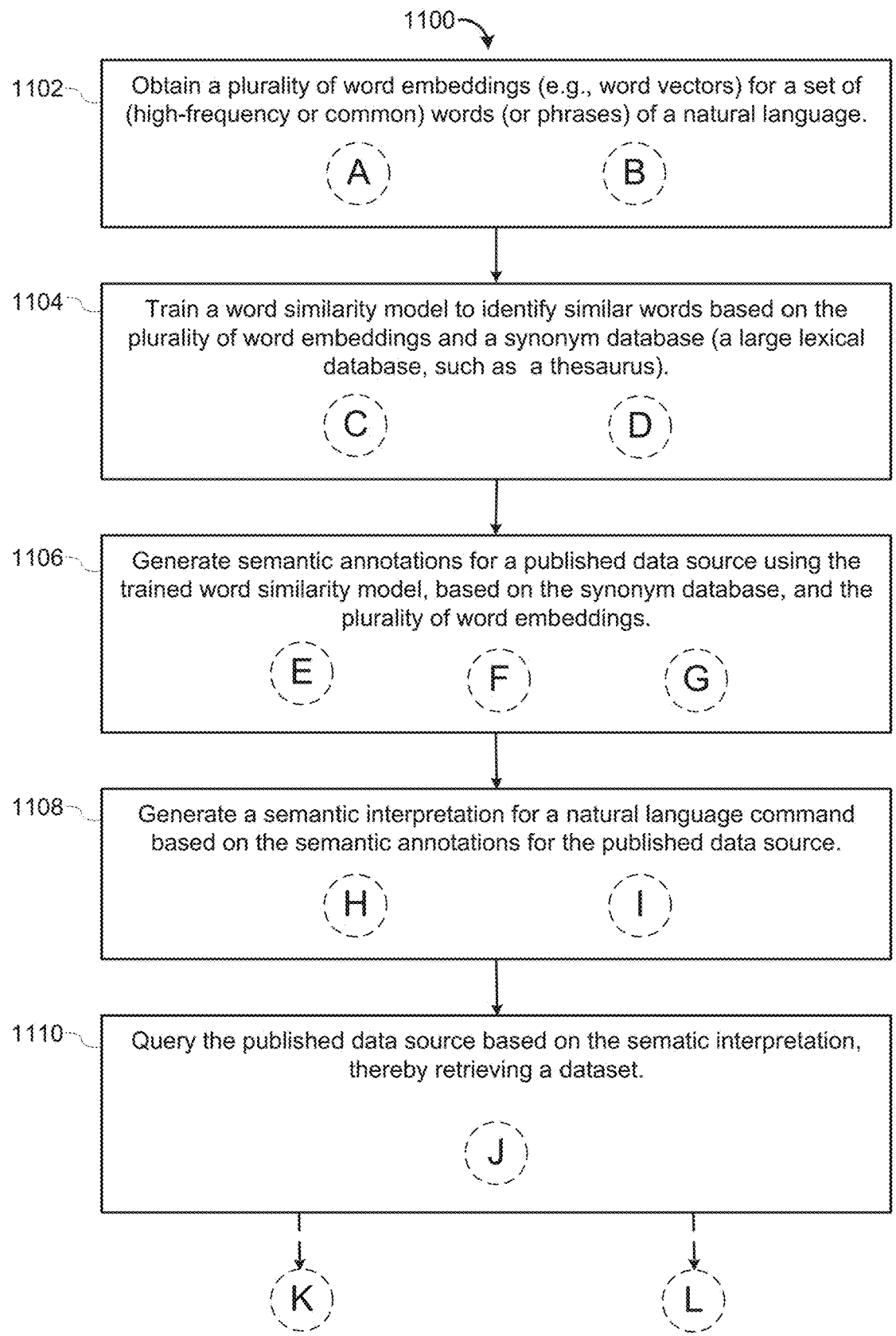
FIGS. 11A-11P provide a flowchart of a method of processing natural language commands, in accordance with some implementations.
Figure 11B:
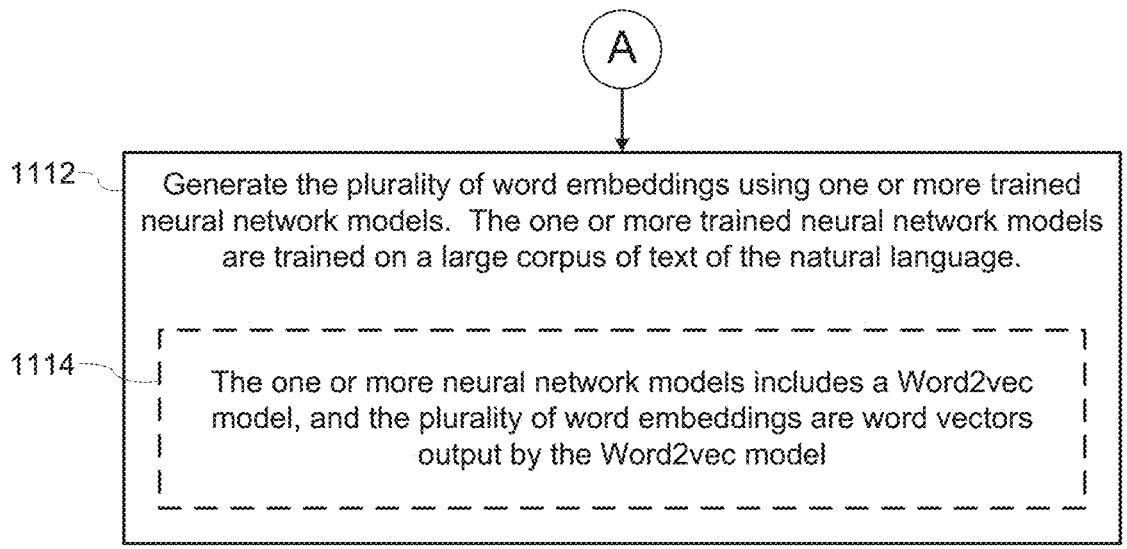
Figure 11C:
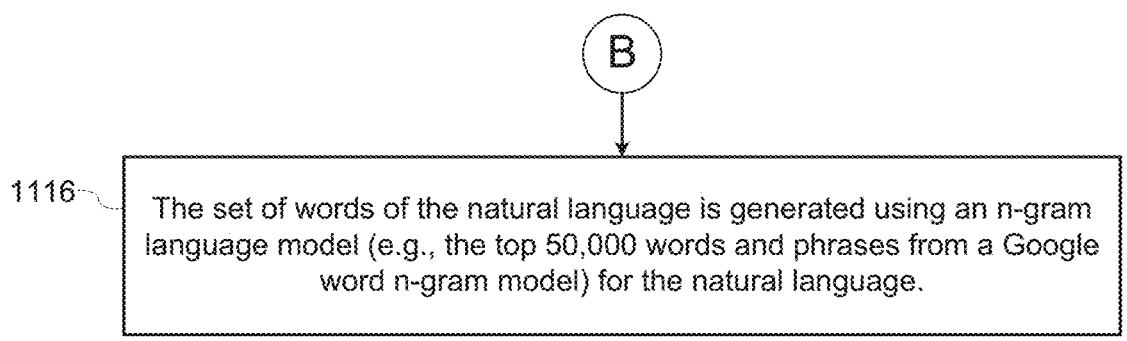
Figure 11D:
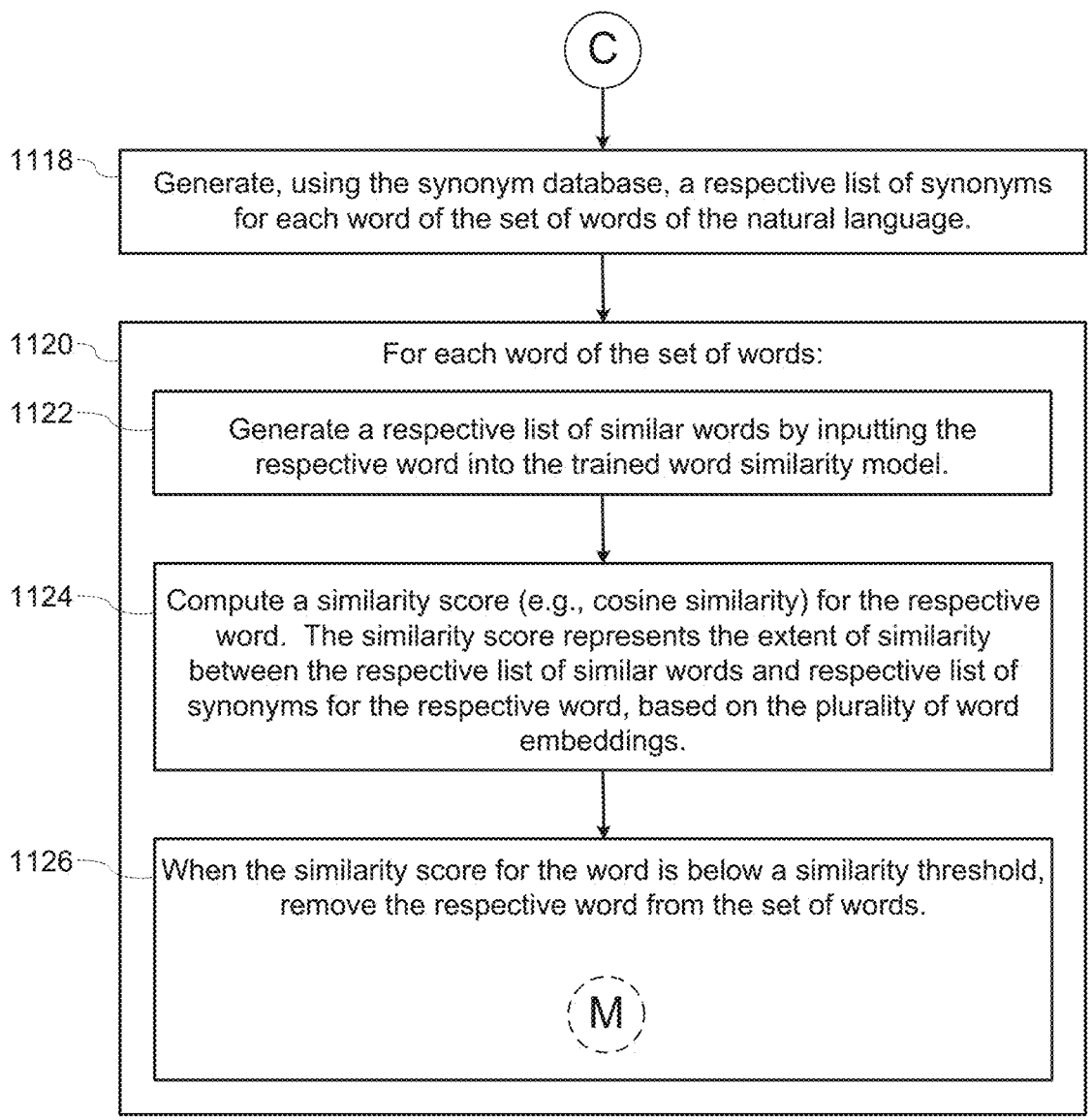
Figure 11E:
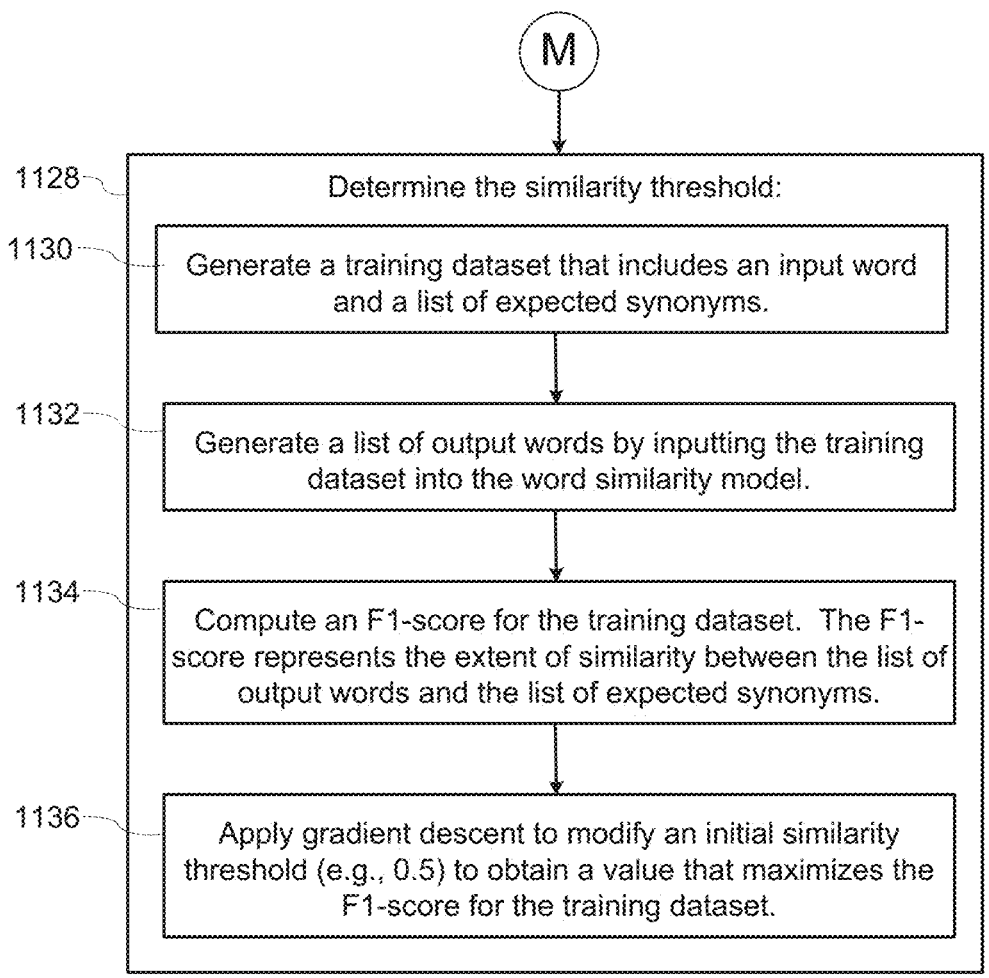
Figure 11F:
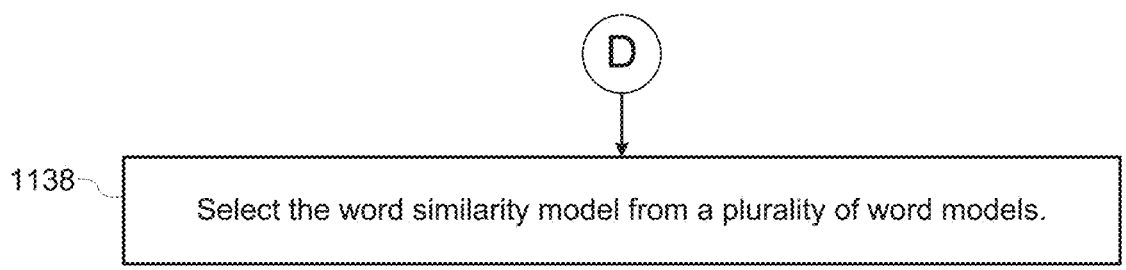
Figure 11G:
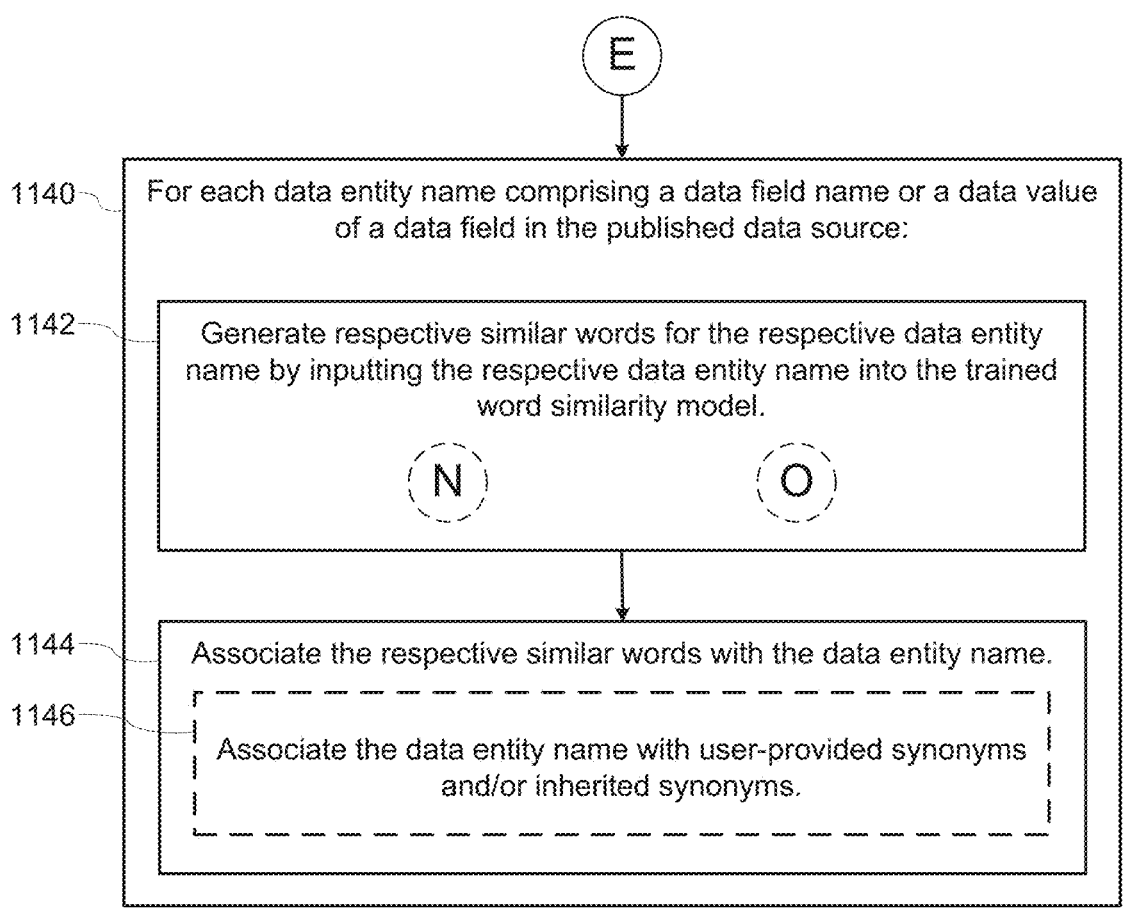
Figure 11H:
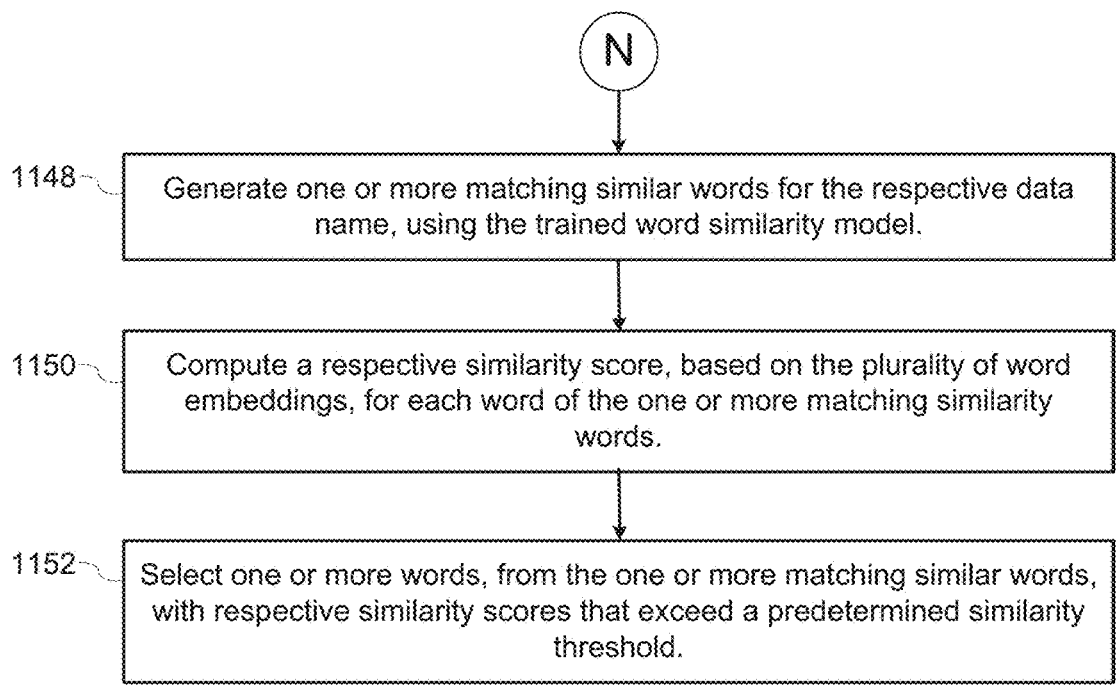
Figure 11I:
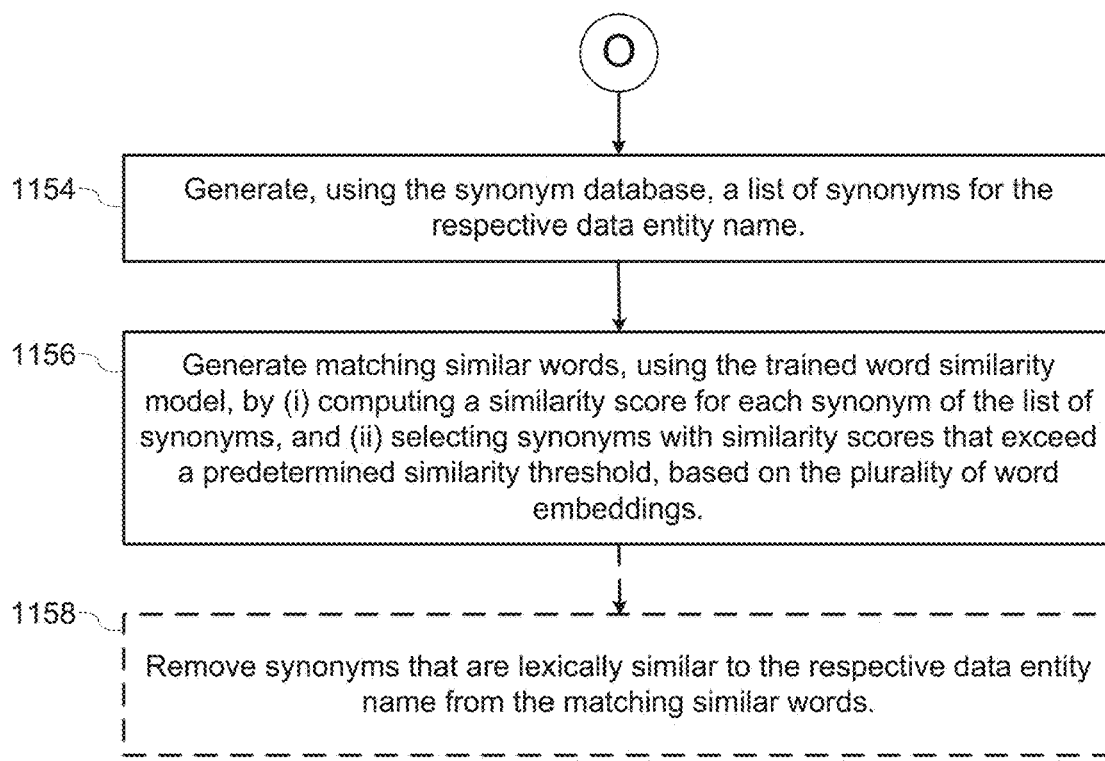
Figure 11J:
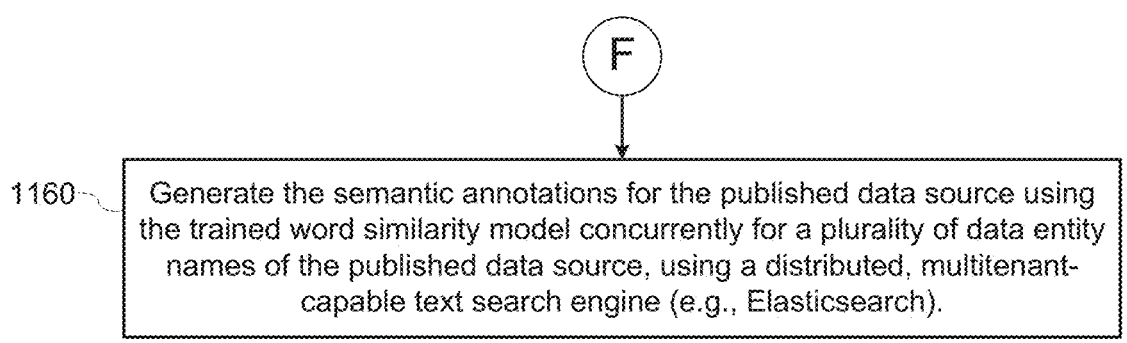
Figure 11K:
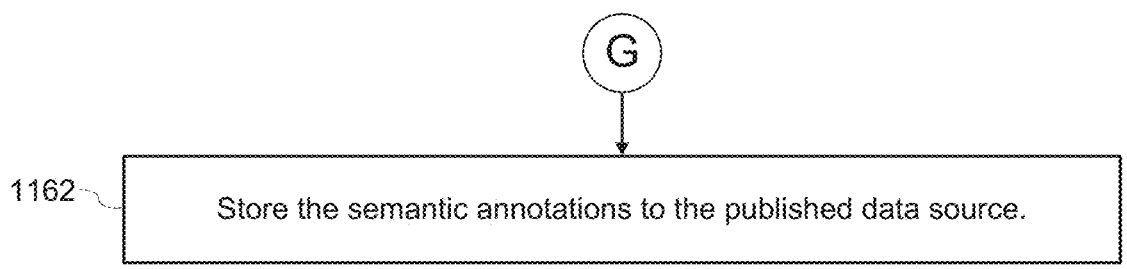
Figure 11L:
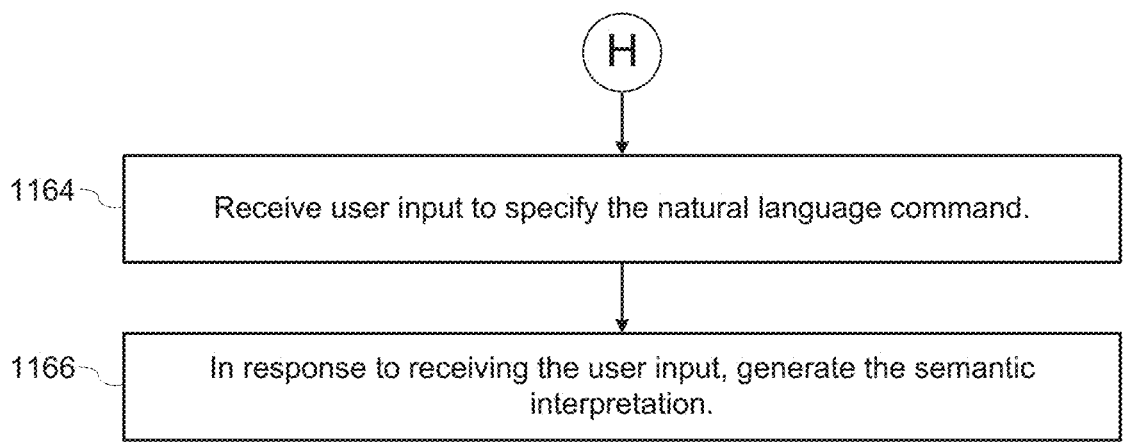
Figure 11M:
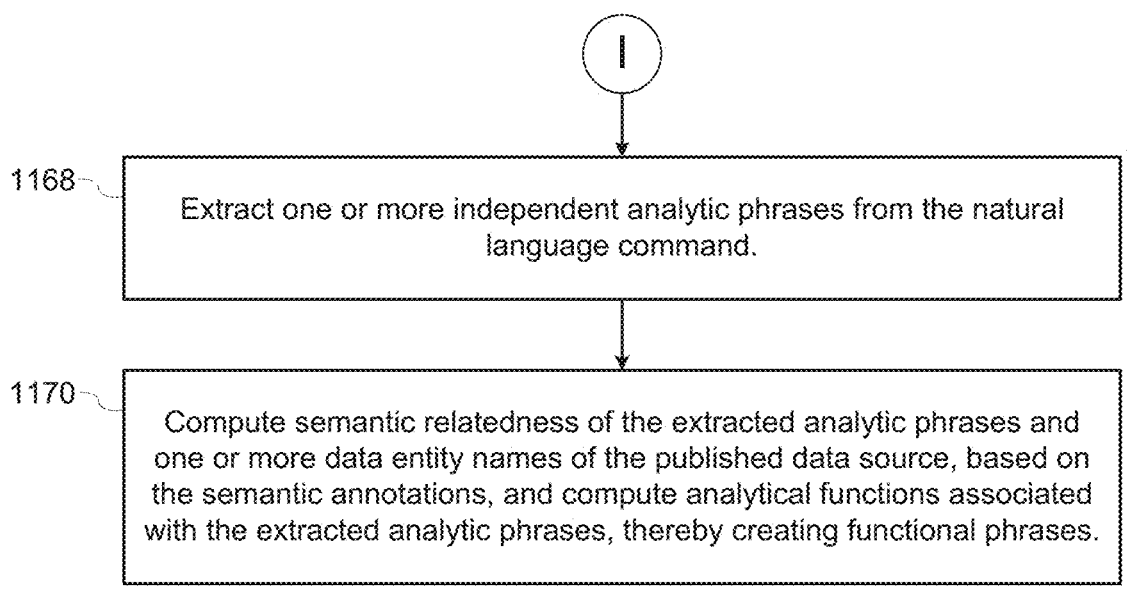
Figure 11N:
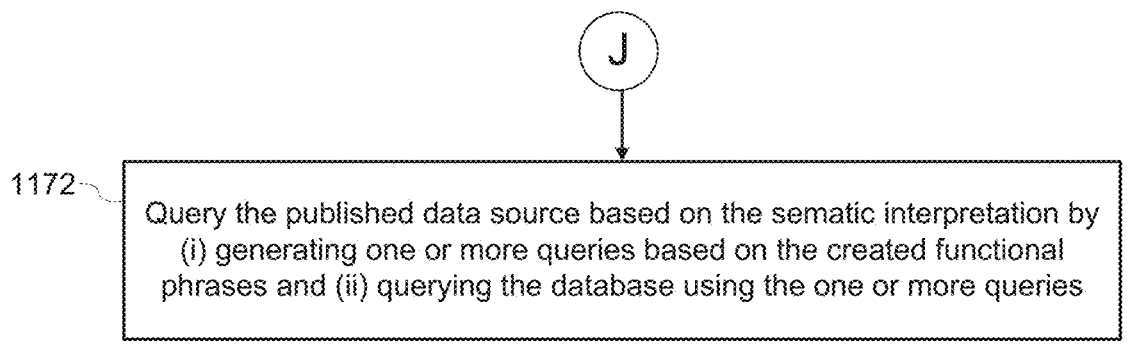
Figure 11O:
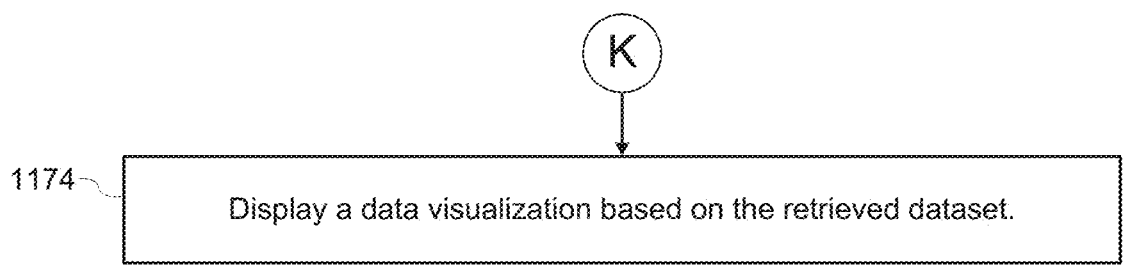

FIGS. 11A-11O provide a flowchart of a method 1100 of processing natural language commands, in accordance with some implementations. The method is typically performed at a computer 200 having a display 208, one or more processors 202, and memory 214 storing one or more programs configured for execution by the one or more processors.

The method includes obtaining (1102) a plurality of word embeddings (e.g., word vectors) for a set of words (or phrases) of a natural language. In some implementations, the set of words includes high-frequency or common words of the natural language. Referring next to FIG. 11B, in some implementations, the method further includes generating (1112) the plurality of word embeddings using one or more trained neural network models. The one or more trained neural network models are trained on a large corpus of text of the natural language. In some implementations, the one or more neural network models includes (1114) a Word2vec model, and the plurality of word embeddings are word vectors output by the Word2vec model. Referring next to FIG. 11C, in some implementations, the set of words of the natural language is generated (1116) using an n-gram language model (e.g., the top 50,000 words and phrases from a Google word n-gram model) for the natural language.

Referring back to FIG. 11A, the method also includes training (1104) a word similarity model to identify similar words based on the plurality of word embeddings and a synonym database (e.g., a large lexical database, such as a thesaurus).

Referring next to FIG. 11D, in some implementations, training the word similarity model includes generating (1118), using the synonym database, a respective list of synonyms for each word of the set of words of the natural language. The method performs (1120) a sequence of steps for each word of the set of words. The sequence of steps includes generating (1122) a respective list of similar words by inputting the respective word into the trained word similarity model; computing (1124) a similarity score (e.g., cosine similarity) for the respective word; and when the similarity score for the word is below a similarity threshold, removing (1126) the respective word from the set of words. The similarity score represents the extent of similarity between the respective list of similar words and the respective list of synonyms for the respective word, based on the plurality of word embeddings Referring next to FIG. 11E, in some implementations, the similarity threshold is determined (1128) by: generating (1130) a training dataset that includes an input word and a list of expected synonyms; generating (1132) a list of output words by inputting the training dataset into the word similarity model; computing (1134) a F1-score for the training dataset; and applying (1136) gradient descent to modify an initial similarity threshold (e.g., 0.5) to obtain a value that maximizes the F1-score for the training dataset. The F1-score represents (1134) the extent of similarity between the list of output words and the list of expected synonyms.

Referring next to FIG. 11F, in some implementations, the method further includes selecting (1138) the word similarity model from a plurality of word models.

Referring back to FIG. 11A, the method also includes generating (1106) semantic annotations for a published data source using the trained word similarity model, based on the synonym database, and the plurality of word embeddings. Referring next to FIG. 11G, in some implementations, generating the semantic annotations includes performing (1140) a sequence of steps for each data entity name comprising a data field name or a data value of a data field in the published data source. The sequence of steps includes generating (1142) respective similar words for the respective data entity name by inputting the respective data entity name into the trained word similarity model, and associating (1144) the respective similar words with the data entity name. In some implementations, the method further includes associating (1146) the data entity name with user-provided synonyms and/or inherited synonyms.

Referring next to FIG. 11H, in some implementations, generating the respective similar words for the respective data entity name includes: generating (1148) one or more matching similar words for the respective data name, using the trained word similarity model; computing (1150) a respective similarity score, based on the plurality of word embeddings, for each word of the one or more matching similarity words; and selecting (1152) one or more words, from the one or more matching similar words, with respective similarity scores that exceed a predetermined similarity threshold.

Referring next to FIG. 11I, in some implementations, generating the respective similar words for the respective data entity name includes: generating (1154), using the synonym database, a list of synonyms for the respective data entity name; and generating (1156) matching similar words, using the trained word similarity model, by (i) computing a similarity score for each synonym of the list of synonyms, and (ii) selecting synonyms with similarity scores that exceed a predetermined similarity threshold, based on the plurality of word embeddings. In some implementations, the method further includes removing (1158) synonyms that are lexically similar to (e.g., have the same base words as) the respective data entity name from the matching similar words.

Referring next to FIG. 11J, in some implementations, generating the semantic annotations for the published data source using the trained word similarity model is performed concurrently (1160) for a plurality of data entity names of the published data source, using a distributed, multitenant-capable text search engine (e.g., Elasticsearch).

Referring next to FIG. 11K, in some implementations, the method further includes storing (1162) the semantic annotations to the published data source.

Referring back to FIG. 11A, the method also includes generating (1108) a semantic interpretation for a natural language command based on the semantic annotations for the published data source. Referring next to FIG. 11L, in some implementations, the method further includes receiving (1164) user input to specify the natural language command; and in response to receiving the user input, generating (1166) the semantic interpretation. Referring next to FIG. 11M, in some implementations, generating the semantic interpretation includes extracting (1168) one or more independent analytic phrases from the natural language command, and computing (1170) semantic relatedness of the extracted analytic phrases and one or more data entity names of the published data source, based on the semantic annotations, and computing analytical functions associated with the extracted analytic phrases, thereby creating functional phrases.

Referring back to FIG. 11A, the method also includes querying (1110) the published data source based on the sematic interpretation, thereby retrieving a dataset. Referring to FIG. 11N, in some implementations, querying the published data source based on the semantic interpretation includes (1172): (i) generating one or more queries based on the created functional phrases and (ii) querying the database using the one or more queries.

Referring next to FIG. 11O, in some implementations, the method further includes displaying (1174) a data visualization based on the retrieved dataset.

Figure 11P:
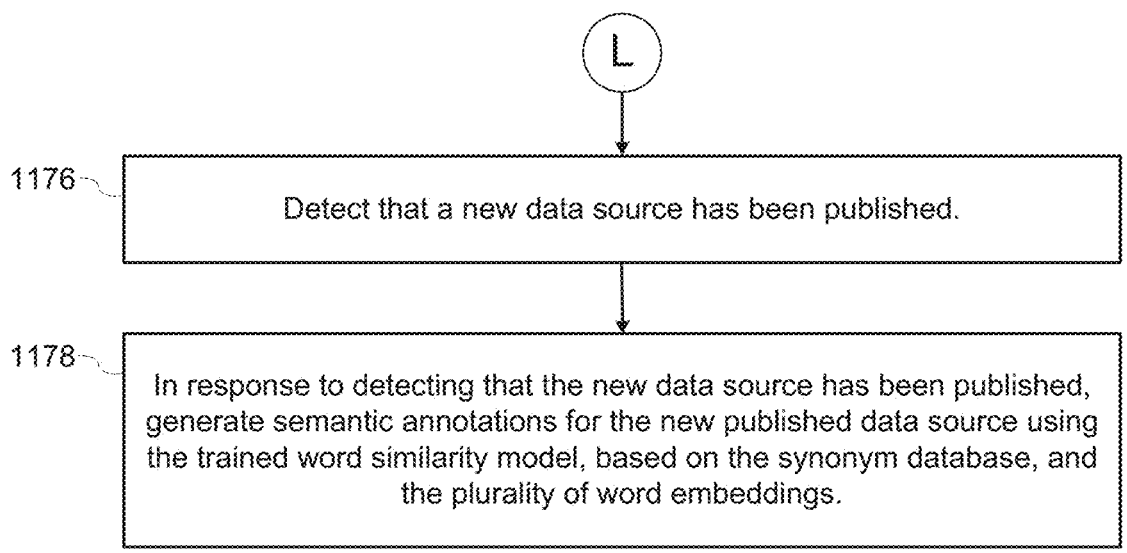

Referring next to FIG. 11P, in some implementations, the method further includes detecting (1176) that a new data source has been published. In response to detecting that the new data source has been published, the method generates (1178) semantic annotations for the new published data source using the trained word similarity model, based on the synonym database, and the plurality of word embeddings.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of processing natural language commands, comprising:
    obtaining a plurality of word embeddings for a set of words of a natural language;
    training a word similarity model to identify similar words based on the plurality of word embeddings and a synonym database;
    generating semantic annotations for a published data source using the trained word similarity model, based on the synonym database, and the plurality of word embeddings, and indexing the plurality of word embeddings;
    generating a semantic interpretation for a natural language command based on the semantic annotations for the published data source; and
    querying the published data source based on the sematic interpretation, thereby retrieving a dataset.

2. The method of claim 1, wherein generating the semantic annotations comprises:
    for each data entity name comprising a data field name or a data value of a data field in the published data source:
        generating respective similar words for the respective data entity name by inputting the respective data entity name into the trained word similarity model; and
        associating the respective similar words with the data entity name.

3. The method of claim 2, further comprising associating the data entity name with user-provided synonyms and/or inherited synonyms.

4. The method of claim 2, wherein generating the respective similar words for the respective data entity name comprises:
    generating one or more matching similar words for the respective data name, using the trained word similarity model;
    computing a respective similarity score, based on the plurality of word embeddings, for each word of the one or more matching similarity words; and
    selecting one or more words, from the one or more matching similar words, with respective similarity scores that exceed a predetermined similarity threshold.

5. The method of claim 2, wherein generating the respective similar words for the respective data entity name comprises:
    generating, using the synonym database, a list of synonyms for the respective data entity name; and
    generating matching similar words, using the trained word similarity model, by (i) computing a similarity score for each synonym of the list of synonyms, and (ii) selecting synonyms with similarity scores that exceed a predetermined similarity threshold, based on the plurality of word embeddings.

6. The method of claim 5, further comprising removing synonyms that are lexically similar to the respective data entity name from the matching similar words.

7. The method of claim 1, wherein training the word similarity model comprises:
    generating, using the synonym database, a respective list of synonyms for each word of the set of words of the natural language; and
    for each word of the set of words:
        generating a respective list of similar words by inputting the respective word into the trained word similarity model;
        computing a similarity score for the respective word, wherein the similarity score represents extent of similarity between the respective list of similar words and respective list of synonyms for the respective word, based on the plurality of word embeddings; and
        in accordance with a determination that the similarity score for the word is below a similarity threshold, removing the respective word from the set of words.

8. The method of claim 7, wherein the similarity threshold is obtained by:
    generating a training dataset that includes an input word and a list of expected synonyms;
    generating a list of output words by inputting the training dataset into the word similarity model;
    computing an F1-score for the training dataset, wherein the F1-score represents extent of similarity between the list of output words and the list of expected synonyms; and
    applying gradient descent to modify an initial similarity threshold to obtain a value that maximizes the F1-score for the training dataset.

9. The method of claim 1, further comprising:
    detecting that a new data source has been published; and
    in response to detecting that the new data source has been published, generating semantic annotations for the new data source using the trained word similarity model, based on the synonym database, and the plurality of word embeddings.

10. The method of claim 1, wherein the set of words of the natural language is generated using an n-gram language model for the natural language.

11. The method of claim 1, further comprising generating the plurality of word embeddings using one or more trained neural network models, wherein the one or more trained neural network models are trained on a large corpus of text of the natural language.

12. The method of claim 11, wherein the one or more neural network models includes a Word2vec model, and the plurality of word embeddings are word vectors output by the Word2vec model.

13. The method of claim 1, wherein generating the semantic interpretation comprises:
   extracting one or more independent analytic phrases from the natural language command; and
   computing semantic relatedness of the extracted analytic phrases and one or more data entity names of the published data source, based on the semantic annotations, and computing analytical functions associated with the extracted analytic phrases, thereby creating functional phrases;
   wherein querying the published data source based on the sematic interpretation comprises (i) generating one or more queries based on the created functional phrases and (ii) querying the database using the one or more queries.

14. The method of claim 1, further comprising selecting the word similarity model from a plurality of word models.

15. The method of claim 1, further comprising, storing the semantic annotations to the published data source.

16. The method of claim 1, further comprising displaying a data visualization based on the retrieved dataset.

17. The method of claim 1, further comprising:
   receiving user input to specify the natural language command; and
   in response to receiving the user input, generating the semantic interpretation.

18. The method of claim 1, wherein generating the semantic annotations for the published data source using the trained word similarity model is performed concurrently for a plurality of data entity names of the published data source, using a distributed, multitenant-capable text search engine.

19. A computer system for processing natural language commands, comprising:
   one or more processors; and
   memory;
   wherein the memory stores one or more programs configured for execution by the one or more processors, and the one or more programs comprise instructions for:
   obtaining a plurality of word embeddings for a set of words of a natural language;
   training a word similarity model to identify similar words based on the plurality of word embeddings and a synonym database; and
   generating semantic annotations for a published data source using the trained word similarity model, based on the synonym database, and the plurality of word embeddings, and indexing the plurality of word embeddings;
   generating a semantic interpretation of a natural language command based on the semantic annotations for the published data source; and
   querying the published data source based on the sematic interpretation, thereby retrieving a dataset.

20. A non-transitory computer readable storage medium storing one or more programs configured for execution by a computer system having a display, one or more processors, and memory, the one or more programs comprising instructions for:
   obtaining a plurality of word embeddings for a set of words of a natural language;
   training a word similarity model to identify similar words based on the plurality of word embeddings and a synonym database;
   generating semantic annotations for a published data source using the trained word similarity model, based on the synonym database, and the plurality of word embeddings, and indexing the plurality of word embeddings;
   generating a semantic interpretation of a natural language command based on the semantic annotations for the published data source; and
   querying the published data source based on the sematic interpretation, thereby retrieving a dataset.

* * * * *